United States Patent
McBride et al.

(10) Patent No.: US 11,544,692 B1
(45) Date of Patent: ***Jan. 3, 2023

(54) SYSTEMS AND METHODS USING MOBILE COMMUNICATION HANDSETS FOR PROVIDING POSTAGE

(71) Applicant: Stamps.com Inc., El Segundo, CA (US)

(72) Inventors: Kenneth Thomas McBride, Palos Verdes Estates, CA (US); John Roland Clem, Manhattan Beach, CA (US)

(73) Assignee: Auctane, Inc., Austin, TX (US)

( * ) Notice: Subject to any disclaimer, the term of this patent is extended or adjusted under 35 U.S.C. 154(b) by 201 days.

This patent is subject to a terminal disclaimer.

(21) Appl. No.: 16/894,697

(22) Filed: Jun. 5, 2020

Related U.S. Application Data

(63) Continuation of application No. 13/110,476, filed on May 18, 2011, now Pat. No. 10,713,634.

(51) Int. Cl.
*G06Q 20/20* (2012.01)

(52) U.S. Cl.
CPC ....... *G06Q 20/204* (2013.01); *G06Q 2250/00* (2013.01)

(58) Field of Classification Search
None
See application file for complete search history.

(56) References Cited

U.S. PATENT DOCUMENTS

| | | |
|---|---|---|
| 1,684,756 A | 9/1928 | Close |
| 1,988,908 A | 1/1935 | MacKinnon |
| 2,825,498 A | 3/1958 | Alves |
| 2,887,326 A | 5/1959 | Kramer |
| 2,964,232 A | 12/1960 | Levyn |
| 3,111,084 A | 11/1963 | Ridenour et al. |
| 3,221,980 A | 12/1965 | Mercur |
| 3,380,648 A | 4/1968 | De Lyra |
| 3,584,696 A | 6/1971 | Eblowitz |

(Continued)

FOREIGN PATENT DOCUMENTS

| | | |
|---|---|---|
| CA | 2470371 A1 | 5/2003 |
| DE | 2912696 A1 | 10/1979 |

(Continued)

OTHER PUBLICATIONS

Avery, Susan, "With new postage meters buyers can stamp out costs," Purchasing, 132, 11, Jul. 17, 2003, pp. 98-99.

(Continued)

*Primary Examiner* — Jason Borlinghaus
(74) *Attorney, Agent, or Firm* — Norton Rose Fulbright US LLP

(57) ABSTRACT

Systems and methods which provide postage indicia using mobile communication handsets are shown. According to embodiments, users are enabled to introduce mail pieces into a mail delivery stream which are accepted as having activated, value comprising postage indicia associated therewith without the use of traditional metering systems, processor-based postage generation and printing systems, or even printers. Instead, a token comprising substantially unique identification information identifying a mail piece is activated as an activated token having postage value associated therewith using mobile communication handsets, such as a smart phone, network enabled personal digital assistant, etc. according to embodiments of the invention.

20 Claims, 5 Drawing Sheets

(56) References Cited

U.S. PATENT DOCUMENTS

| | | |
|---|---|---|
| 3,594,727 A | 7/1971 | Braun |
| 3,658,239 A | 4/1972 | Foutz |
| 3,691,726 A | 9/1972 | Stephens et al. |
| 3,747,837 A | 7/1973 | Wilson |
| 3,938,095 A | 2/1976 | Check, Jr. et al. |
| 3,978,457 A | 8/1976 | Check, Jr. et al. |
| 4,119,194 A | 10/1978 | Freeman et al. |
| 4,201,339 A | 5/1980 | Gunn |
| 4,245,775 A | 1/1981 | Conn |
| 4,253,158 A | 2/1981 | McFiggans |
| 4,271,481 A | 6/1981 | Check, Jr. et al. |
| 4,306,299 A | 12/1981 | Check, Jr. et al. |
| 4,307,293 A | 12/1981 | Lazzarotti et al. |
| 4,310,720 A | 1/1982 | Check, Jr. |
| 4,376,299 A | 3/1983 | Rivest |
| 4,511,793 A | 4/1985 | Racanelli |
| 4,565,317 A | 1/1986 | Kranz |
| 4,629,871 A | 12/1986 | Scribner et al. |
| 4,641,347 A | 2/1987 | Clark et al. |
| 4,649,266 A | 3/1987 | Eckert |
| 4,661,001 A | 4/1987 | Takai et al. |
| 4,709,850 A | 12/1987 | Wagner |
| 4,725,718 A | 2/1988 | Sansone et al. |
| 4,739,343 A | 4/1988 | Dolan |
| 4,743,747 A | 5/1988 | Fougere et al. |
| 4,744,554 A | 5/1988 | Kulpa et al. |
| 4,757,537 A | 7/1988 | Edelmann et al. |
| 4,760,532 A | 7/1988 | Sansone et al. |
| 4,763,271 A | 8/1988 | Field |
| 4,775,246 A | 10/1988 | Edelmann et al. |
| 4,784,317 A | 11/1988 | Chen et al. |
| 4,796,181 A | 1/1989 | Wiedemer |
| 4,799,156 A | 1/1989 | Shavit et al. |
| 4,800,506 A | 1/1989 | Axelrod et al. |
| 4,802,218 A | 1/1989 | Wright et al. |
| 4,809,185 A | 2/1989 | Talmadge |
| 4,812,994 A | 3/1989 | Taylor et al. |
| 4,821,195 A | 4/1989 | Baer et al. |
| 4,831,554 A | 5/1989 | Storace et al. |
| 4,831,555 A | 5/1989 | Sansone et al. |
| 4,837,701 A | 6/1989 | Sansone et al. |
| 4,853,865 A | 8/1989 | Sansone et al. |
| 4,858,138 A | 8/1989 | Talmadge |
| 4,862,386 A | 8/1989 | Axelrod et al. |
| 4,864,618 A | 9/1989 | Wright et al. |
| 4,868,757 A | 9/1989 | Gil |
| 4,872,705 A | 10/1989 | Hartfeil |
| 4,872,706 A | 10/1989 | Brewen et al. |
| 4,873,645 A | 10/1989 | Hunter et al. |
| 4,875,174 A | 10/1989 | Olodort et al. |
| 4,876,000 A | 10/1989 | Mikhail |
| 4,893,249 A | 1/1990 | Silverberg |
| 4,900,903 A | 2/1990 | Wright et al. |
| 4,900,904 A | 2/1990 | Wright et al. |
| 4,900,941 A | 2/1990 | Barton et al. |
| 4,901,241 A | 2/1990 | Schneck |
| 4,908,770 A | 3/1990 | Breault et al. |
| 4,910,686 A | 3/1990 | Chang et al. |
| 4,919,325 A | 4/1990 | Culver |
| 4,933,849 A | 6/1990 | Connell et al. |
| 4,934,846 A | 6/1990 | Gilham et al. |
| 4,941,091 A | 7/1990 | Breault et al. |
| 4,947,333 A | 8/1990 | Sansone et al. |
| 4,949,381 A | 8/1990 | Pastor |
| 4,992,940 A | 2/1991 | Dworkin |
| 4,993,752 A | 2/1991 | Juszak |
| 4,998,204 A | 3/1991 | Sansone et al. |
| 5,025,141 A | 6/1991 | Bolan |
| 5,044,669 A | 9/1991 | Berry |
| 5,047,928 A | 9/1991 | Wiedemer |
| 5,058,008 A | 10/1991 | Schumacher |
| 5,065,000 A | 11/1991 | Pusic et al. |
| 5,067,088 A | 11/1991 | Schneiderhan |
| 5,075,862 A | 12/1991 | Doeberl et al. |
| 5,077,792 A | 12/1991 | Herring |
| 5,079,714 A | 1/1992 | Manduley et al. |
| 5,085,470 A | 2/1992 | Peach et al. |
| 5,091,771 A | 2/1992 | Bolan et al. |
| 5,094,554 A | 3/1992 | Hurd et al. |
| 5,111,030 A | 5/1992 | Brasington et al. |
| 5,119,306 A | 6/1992 | Metelits et al. |
| 5,136,647 A | 8/1992 | Haber et al. |
| 5,142,482 A | 8/1992 | Sansone |
| 5,150,407 A | 9/1992 | Chan |
| 5,156,467 A | 10/1992 | Kitahara et al. |
| 5,200,903 A | 4/1993 | Gilham et al. |
| 5,202,834 A | 4/1993 | Gilham |
| 5,222,018 A | 6/1993 | Sharpe et al. |
| 5,233,657 A | 8/1993 | Gunther |
| 5,237,506 A | 8/1993 | Horbal et al. |
| 5,239,168 A | 8/1993 | Dursty, Jr. et al. |
| 5,289,540 A | 2/1994 | Jones |
| 5,316,208 A | 5/1994 | Petkovsek |
| 5,319,562 A | 6/1994 | Whitehouse |
| 5,323,323 A | 6/1994 | Gilham |
| 5,323,465 A | 6/1994 | Avame |
| 5,326,181 A | 7/1994 | Eisner et al. |
| 5,341,505 A | 8/1994 | Whitehouse |
| 5,360,628 A | 11/1994 | Butland |
| 5,375,172 A | 12/1994 | Chrosny |
| 5,384,886 A | 1/1995 | Rourke |
| 5,388,049 A | 2/1995 | Sansone et al. |
| 5,390,849 A | 2/1995 | Frissard |
| 5,410,642 A | 4/1995 | Hakamatsuka et al. |
| 5,423,573 A | 6/1995 | de Passille |
| 5,425,586 A | 6/1995 | Berson |
| 5,437,441 A | 8/1995 | Tuhro et al. |
| 5,439,721 A | 8/1995 | Pedroli et al. |
| 5,449,200 A | 9/1995 | Andric et al. |
| 5,454,038 A | 9/1995 | Cordery et al. |
| 5,468,945 A | 11/1995 | Huggett et al. |
| 5,471,925 A | 12/1995 | Heinrich et al. |
| 5,476,420 A | 12/1995 | Manning |
| 5,483,445 A | 1/1996 | Pickering |
| 5,485,369 A | 1/1996 | Nicholls et al. |
| 5,490,077 A | 2/1996 | Freytag |
| 5,494,445 A | 2/1996 | Sekiguchi et al. |
| 5,501,393 A | 3/1996 | Walz |
| 5,502,304 A | 3/1996 | Berson et al. |
| 5,510,992 A | 4/1996 | Kara |
| 5,524,995 A | 6/1996 | Brookner et al. |
| 5,554,842 A | 9/1996 | Connell et al. |
| 5,569,317 A | 10/1996 | Sarada et al. |
| 5,573,277 A | 11/1996 | Petkovsek |
| 5,583,779 A | 12/1996 | Naclerio et al. |
| 5,598,970 A | 2/1997 | Mudry et al. |
| 5,600,562 A | 2/1997 | Guenther |
| 5,601,313 A | 2/1997 | Konkol et al. |
| 5,602,742 A | 2/1997 | Solondz et al. |
| 5,602,743 A | 2/1997 | Freytag |
| 5,606,507 A | 2/1997 | Kara |
| 5,606,613 A | 2/1997 | Lee et al. |
| 5,612,541 A | 3/1997 | Hoffmann et al. |
| 5,612,889 A | 3/1997 | Pintsov et al. |
| 5,615,123 A | 3/1997 | Davidson et al. |
| 5,615,312 A | 3/1997 | Kohler |
| 5,617,519 A | 4/1997 | Herbert |
| 5,619,571 A | 4/1997 | Sandstrom et al. |
| 5,623,546 A | 4/1997 | Hardy et al. |
| D380,007 S | 6/1997 | Kara |
| 5,635,694 A | 6/1997 | Tuhro |
| 5,649,118 A | 7/1997 | Carlisle et al. |
| 5,650,934 A | 7/1997 | Manduley |
| 5,651,238 A | 7/1997 | Belec et al. |
| 5,655,023 A | 8/1997 | Cordery et al. |
| 5,663,547 A | 9/1997 | Ziarno |
| 5,666,215 A | 9/1997 | Fredlund et al. |
| 5,666,284 A | 9/1997 | Kara |
| 5,682,318 A | 10/1997 | Kara |
| 5,696,829 A | 12/1997 | Cordery et al. |
| 5,706,502 A | 1/1998 | Foley et al. |
| 5,708,422 A | 1/1998 | Blonder et al. |
| 5,715,314 A | 2/1998 | Payne et al. |
| 5,717,596 A | 2/1998 | Bernard et al. |

(56) References Cited

U.S. PATENT DOCUMENTS

| | | |
|---|---|---|
| 5,717,597 A | 2/1998 | Kara |
| 5,717,980 A | 2/1998 | Oka et al. |
| 5,726,897 A | 3/1998 | Tammi et al. |
| 5,729,459 A | 3/1998 | Brandien et al. |
| 5,729,460 A | 3/1998 | Plett et al. |
| 5,729,674 A | 3/1998 | Rosewarne et al. |
| 5,737,729 A | 4/1998 | Denman |
| 5,742,683 A | 4/1998 | Lee et al. |
| 5,745,887 A | 4/1998 | Gargiulo et al. |
| 5,758,327 A | 5/1998 | Gardner et al. |
| 5,758,328 A | 5/1998 | Giovannoli |
| D395,333 S | 6/1998 | Kara |
| 5,768,132 A | 6/1998 | Cordery et al. |
| 5,774,554 A | 6/1998 | Gilham |
| 5,774,886 A | 6/1998 | Kara |
| 5,778,076 A | 7/1998 | Kara et al. |
| 5,781,438 A | 7/1998 | Lee et al. |
| 5,791,553 A | 8/1998 | Fabel |
| 5,793,867 A | 8/1998 | Cordery et al. |
| 5,796,834 A | 8/1998 | Whitney et al. |
| 5,799,290 A | 8/1998 | Dolan et al. |
| 5,801,364 A | 9/1998 | Kara et al. |
| 5,801,944 A | 9/1998 | Kara |
| 5,805,810 A | 9/1998 | Maxwell |
| 5,812,991 A | 9/1998 | Kara |
| 5,819,240 A | 10/1998 | Kara |
| 5,822,739 A | 10/1998 | Kara |
| 5,825,893 A | 10/1998 | Kara |
| 5,836,617 A | 11/1998 | Beaudoin et al. |
| 5,842,178 A | 11/1998 | Giovannoli |
| 5,860,068 A | 1/1999 | Cook |
| 5,871,288 A | 2/1999 | Ryan, Jr. et al. |
| 5,884,277 A | 3/1999 | Khosla |
| 5,902,439 A | 5/1999 | Pike et al. |
| 5,912,682 A | 6/1999 | Parkos |
| 5,923,406 A | 7/1999 | Brasington et al. |
| 5,923,885 A | 7/1999 | Johnson et al. |
| 5,924,738 A | 7/1999 | Konkol et al. |
| 5,929,415 A | 7/1999 | Berson |
| 5,930,796 A | 7/1999 | Pierce et al. |
| 5,932,139 A | 8/1999 | Oshima et al. |
| 5,936,865 A | 8/1999 | Pintsov et al. |
| 5,946,671 A | 8/1999 | Herring |
| 5,950,916 A | 9/1999 | Santangelo |
| 5,960,418 A | 9/1999 | Kelly et al. |
| 5,983,209 A | 11/1999 | Kara |
| 5,987,441 A | 11/1999 | Lee et al. |
| 5,995,985 A | 11/1999 | Cai |
| 6,005,945 A | 12/1999 | Whitehouse |
| 6,010,069 A | 1/2000 | Debois |
| 6,010,156 A | 1/2000 | Block |
| 6,026,385 A | 2/2000 | Harvey et al. |
| 6,033,751 A | 3/2000 | Kline |
| 6,047,273 A | 4/2000 | Vaghi |
| 6,050,486 A | 4/2000 | French et al. |
| 6,061,670 A | 5/2000 | Brand |
| 6,061,671 A | 5/2000 | Baker et al. |
| 6,079,327 A | 6/2000 | Sarada |
| D434,438 S | 11/2000 | Kara |
| 6,142,380 A | 11/2000 | Sansone et al. |
| 6,155,476 A | 12/2000 | Fabel |
| 6,173,888 B1 | 1/2001 | Fabel |
| 6,175,825 B1 | 1/2001 | Fruechtel |
| 6,175,826 B1 | 1/2001 | Malandra, Jr. et al. |
| 6,181,433 B1 | 1/2001 | Hayama et al. |
| 6,184,534 B1 | 2/2001 | Stephany et al. |
| 6,199,055 B1 | 3/2001 | Kara et al. |
| 6,208,980 B1 | 3/2001 | Kara |
| 6,209,779 B1 | 4/2001 | Fabel |
| 6,233,565 B1 | 5/2001 | Lewis et al. |
| 6,233,568 B1 | 5/2001 | Kara |
| 6,234,694 B1 | 5/2001 | Brookner |
| 6,244,763 B1 | 6/2001 | Miller |
| 6,249,777 B1 | 6/2001 | Kara et al. |
| 6,256,616 B1 | 7/2001 | Brookner |
| 6,282,524 B1 | 8/2001 | Kramer |
| 6,296,404 B1 | 10/2001 | Pierce et al. |
| 6,311,240 B1 | 10/2001 | Boone et al. |
| 6,322,192 B1 | 11/2001 | Walker |
| 6,327,042 B1 | 12/2001 | Krasuski et al. |
| 6,349,292 B1 | 2/2002 | Sutherland et al. |
| 6,370,844 B1 | 4/2002 | Stricker |
| 6,385,504 B1 | 5/2002 | Pintsov et al. |
| 6,385,731 B2 | 5/2002 | Ananda |
| 6,397,328 B1 | 5/2002 | Pitchenik et al. |
| 6,415,983 B1 | 7/2002 | Ulvr et al. |
| 6,424,954 B1 | 7/2002 | Leon |
| 6,427,021 B1 | 7/2002 | Fischer et al. |
| 6,428,219 B1 | 8/2002 | Stier et al. |
| 6,430,543 B1 | 8/2002 | Lee et al. |
| 6,438,530 B1 | 8/2002 | Heiden et al. |
| 6,461,063 B1 | 10/2002 | Miller et al. |
| 6,470,327 B1 | 10/2002 | Carroll et al. |
| 6,502,912 B1 | 1/2003 | Bernard et al. |
| 6,505,179 B1 | 1/2003 | Kara |
| 6,505,980 B1 | 1/2003 | Allday |
| 6,520,342 B1 | 2/2003 | Dumke et al. |
| 6,523,014 B1 | 2/2003 | Pauschinger |
| 6,526,391 B1 | 2/2003 | Cordery et al. |
| 6,532,452 B1 | 3/2003 | Pintsov et al. |
| 6,594,374 B1 | 7/2003 | Beckstrom et al. |
| 6,595,412 B2 | 7/2003 | Manduley |
| 6,609,117 B2 | 8/2003 | Sutherland et al. |
| 6,655,579 B1 | 12/2003 | Delman et al. |
| 6,671,813 B2 | 12/2003 | Ananda |
| 6,692,031 B2 | 2/2004 | McGrew |
| 6,697,822 B1 | 2/2004 | Armatis et al. |
| 6,701,304 B2 | 3/2004 | Leon |
| 6,722,563 B1 | 4/2004 | Johnson et al. |
| 6,735,575 B1 | 5/2004 | Kara |
| 6,820,201 B1 | 11/2004 | Lincoln et al. |
| 6,834,112 B1 | 12/2004 | Brickell |
| 6,834,273 B1 | 12/2004 | Sansone et al. |
| 6,853,990 B1 | 2/2005 | Thiel |
| 6,865,557 B1 | 3/2005 | Cordery et al. |
| 6,868,406 B1 | 3/2005 | Ogg et al. |
| 6,902,265 B2 | 6/2005 | Critelli et al. |
| 6,904,168 B1 | 6/2005 | Steinberg et al. |
| 6,939,062 B2 | 9/2005 | Ogg et al. |
| 6,945,458 B1 | 9/2005 | Shah et al. |
| 6,946,960 B2 | 9/2005 | Sisson et al. |
| 7,028,902 B2 | 4/2006 | Xu et al. |
| 7,039,214 B2 | 5/2006 | Miller et al. |
| 7,043,053 B1 | 5/2006 | Patton et al. |
| 7,056,410 B2 | 6/2006 | Kuller et al. |
| 7,069,253 B2 | 6/2006 | Leon |
| 7,085,725 B1 | 8/2006 | Leon |
| 7,117,363 B2 | 10/2006 | Lincoln et al. |
| 7,127,434 B2 | 10/2006 | Burningham |
| 7,149,726 B1 | 12/2006 | Lingle et al. |
| 7,162,460 B2 | 1/2007 | Cleckler et al. |
| 7,182,259 B2 | 2/2007 | Lubow et al. |
| 7,191,158 B2 | 3/2007 | Ogg |
| 7,191,336 B2 | 3/2007 | Zeller et al. |
| 7,194,957 B1 | 3/2007 | Leon et al. |
| 7,201,305 B1 | 4/2007 | Correa |
| 7,222,236 B1 | 5/2007 | Pagel |
| 7,225,170 B1 | 5/2007 | Ryan, Jr |
| 7,226,494 B1 | 6/2007 | Schwartz et al. |
| 7,233,929 B1 | 6/2007 | Lingle et al. |
| 7,234,645 B2 | 6/2007 | Silverbrook et al. |
| 7,243,842 B1 | 7/2007 | Leon et al. |
| RE39,779 E | 8/2007 | Kovlakas |
| 7,266,531 B2 | 9/2007 | Pintsov et al. |
| 7,305,556 B2 | 12/2007 | Slick et al. |
| 7,337,152 B1 | 2/2008 | Gawler |
| 7,343,357 B1 | 3/2008 | Kara |
| 7,396,048 B2 | 7/2008 | Janetzke et al. |
| 7,418,599 B2 | 8/2008 | Peters |
| 7,458,612 B1 | 12/2008 | Bennett |
| 7,509,291 B2 | 3/2009 | McBride et al. |
| 7,548,612 B2 | 6/2009 | Weissman et al. |
| 7,577,618 B2 | 8/2009 | Raju et al. |
| 7,711,650 B1 | 5/2010 | Kara |

(56) References Cited

U.S. PATENT DOCUMENTS

| | | |
|---|---|---|
| 7,737,152 B2 | 6/2010 | Springer et al. |
| 7,778,924 B1 | 8/2010 | Ananda |
| 7,784,090 B2 | 8/2010 | Lord et al. |
| 7,828,223 B1 | 11/2010 | Leon et al. |
| 7,831,518 B2 | 11/2010 | Montgomery et al. |
| 7,831,524 B2 | 11/2010 | Whitehouse |
| 7,831,824 B2 | 11/2010 | Abdulhayoglu |
| 7,840,492 B2 | 11/2010 | Leung et al. |
| 7,954,709 B1 | 6/2011 | Leon et al. |
| 7,963,437 B1 | 6/2011 | McBride et al. |
| 8,078,548 B1 | 12/2011 | Ogg |
| 8,100,324 B1 | 1/2012 | Leon |
| 8,155,976 B1 | 4/2012 | Rendich et al. |
| 8,204,835 B1 | 6/2012 | Ogg |
| 8,240,579 B1 | 8/2012 | Bennett |
| 8,250,000 B2 | 8/2012 | Ogg |
| 8,285,651 B1 | 10/2012 | Leon et al. |
| 8,612,361 B1 | 12/2013 | Bussell et al. |
| 8,626,673 B1 | 1/2014 | Bennett |
| 8,775,331 B1 | 7/2014 | Tsuie et al. |
| 9,208,620 B1 | 12/2015 | Bortnak et al. |
| 9,911,246 B1 | 3/2018 | McBride et al. |
| 9,978,185 B1 | 5/2018 | Bortnak et al. |
| 10,373,398 B1 | 8/2019 | McBride et al. |
| 2001/0007086 A1 | 7/2001 | Rogers et al. |
| 2001/0020234 A1 | 9/2001 | Shah et al. |
| 2001/0022060 A1 | 9/2001 | Robertson et al. |
| 2001/0024228 A1 | 9/2001 | Klinefelter et al. |
| 2001/0032881 A1 | 10/2001 | Wells et al. |
| 2001/0037320 A1 | 11/2001 | Allport et al. |
| 2001/0042052 A1 | 11/2001 | Leon |
| 2001/0043350 A1 | 11/2001 | Kasai et al. |
| 2001/0054153 A1 | 12/2001 | Wheeler et al. |
| 2002/0002544 A1 | 1/2002 | Leon et al. |
| 2002/0023057 A1 | 2/2002 | Goodwin et al. |
| 2002/0032573 A1 | 3/2002 | Williams et al. |
| 2002/0032668 A1 | 3/2002 | Kohler et al. |
| 2002/0032784 A1 | 3/2002 | Darago et al. |
| 2002/0033598 A1 | 3/2002 | Beasley |
| 2002/0040333 A1 | 4/2002 | Fuwa |
| 2002/0040353 A1 | 4/2002 | Brown et al. |
| 2002/0046182 A1 | 4/2002 | Bator et al. |
| 2002/0046195 A1 | 4/2002 | Martin et al. |
| 2002/0052841 A1 | 5/2002 | Guthrie et al. |
| 2002/0065577 A1 | 5/2002 | Teraura et al. |
| 2002/0070149 A1 | 6/2002 | Schererz et al. |
| 2002/0073039 A1 | 6/2002 | Ogg et al. |
| 2002/0073050 A1 | 6/2002 | Gusler et al. |
| 2002/0073052 A1 | 6/2002 | Katikaneni et al. |
| 2002/0082935 A1 | 6/2002 | Moore et al. |
| 2002/0083020 A1 | 6/2002 | Leon |
| 2002/0083021 A1 | 6/2002 | Ryan et al. |
| 2002/0095347 A1 | 7/2002 | Cummiskey |
| 2002/0099652 A1 | 7/2002 | Herzen et al. |
| 2002/0116318 A1 | 8/2002 | Thomas et al. |
| 2002/0127040 A1 | 9/2002 | Davies et al. |
| 2002/0143431 A1 | 10/2002 | Sansone |
| 2002/0143714 A1 | 10/2002 | Allport et al. |
| 2002/0149195 A1 | 10/2002 | Beasley |
| 2002/0149196 A1 | 10/2002 | Fabel |
| 2002/0190117 A1 | 12/2002 | Manduley |
| 2002/0198798 A1 | 12/2002 | Ludwig et al. |
| 2003/0002709 A1 | 1/2003 | Wu |
| 2003/0004900 A1 | 1/2003 | Schwartz et al. |
| 2003/0014376 A1 | 1/2003 | DeWitt et al. |
| 2003/0024745 A1 | 2/2003 | Huitt et al. |
| 2003/0029914 A1 | 2/2003 | Hortman et al. |
| 2003/0030270 A1 | 2/2003 | Franko et al. |
| 2003/0037008 A1 | 2/2003 | Raju et al. |
| 2003/0059635 A1 | 3/2003 | Naasani |
| 2003/0065739 A1 | 4/2003 | Shnier |
| 2003/0074324 A1 | 4/2003 | Kresina et al. |
| 2003/0078893 A1 | 4/2003 | Shah et al. |
| 2003/0080182 A1 | 5/2003 | Gunther |
| 2003/0088426 A1 | 5/2003 | Benson et al. |
| 2003/0101143 A1 | 5/2003 | Montgomery et al. |
| 2003/0101147 A1 | 5/2003 | Montgomery et al. |
| 2003/0101148 A1 | 5/2003 | Montgomery et al. |
| 2003/0115162 A1 | 6/2003 | Konick |
| 2003/0129570 A1 | 7/2003 | Alabaster |
| 2003/0130963 A1 | 7/2003 | Stickler et al. |
| 2003/0138345 A1 | 7/2003 | Schwabe |
| 2003/0140017 A1 | 7/2003 | Patton et al. |
| 2003/0144972 A1 | 7/2003 | Cordery et al. |
| 2003/0167241 A1 | 9/2003 | Gilham |
| 2003/0182155 A1 | 9/2003 | Nitzan et al. |
| 2003/0187666 A1 | 10/2003 | Leon |
| 2003/0193530 A1 | 10/2003 | Blackman et al. |
| 2003/0204477 A1 | 10/2003 | McNett |
| 2003/0217018 A1 | 11/2003 | Groff et al. |
| 2003/0233276 A1 | 12/2003 | Pearlman et al. |
| 2003/0236709 A1 | 12/2003 | Hendra et al. |
| 2004/0000787 A1 | 1/2004 | Vig et al. |
| 2004/0001133 A1 | 1/2004 | Critelli et al. |
| 2004/0002926 A1 | 1/2004 | Coffy et al. |
| 2004/0048503 A1 | 3/2004 | Mills et al. |
| 2004/0064422 A1 | 4/2004 | Leon |
| 2004/0070194 A1 | 4/2004 | Janetzke et al. |
| 2004/0082098 A1 | 4/2004 | Schmid |
| 2004/0083179 A1 | 4/2004 | Sesek et al. |
| 2004/0083189 A1 | 4/2004 | Leon |
| 2004/0089482 A1 | 5/2004 | Ramsden et al. |
| 2004/0093312 A1 | 5/2004 | Cordery et al. |
| 2004/0112950 A1 | 6/2004 | Manduley et al. |
| 2004/0122776 A1 | 6/2004 | Sansone |
| 2004/0122777 A1 | 6/2004 | Sansone |
| 2004/0122779 A1 | 6/2004 | Stickler et al. |
| 2004/0125413 A1 | 7/2004 | Cordery |
| 2004/0128264 A1 | 7/2004 | Leung et al. |
| 2004/0174012 A1 | 9/2004 | Hagen |
| 2004/0185827 A1 | 9/2004 | Parks |
| 2004/0185882 A1 | 9/2004 | Gecht et al. |
| 2004/0186811 A1 | 9/2004 | Gullo et al. |
| 2004/0200902 A1 | 10/2004 | Ishioroshi |
| 2004/0211844 A1 | 10/2004 | Marshall |
| 2004/0212833 A1 | 10/2004 | Taskett et al. |
| 2004/0215523 A1 | 10/2004 | Wulff et al. |
| 2004/0215581 A1 | 10/2004 | Lord et al. |
| 2004/0215583 A1 | 10/2004 | Elliott |
| 2004/0220935 A1 | 11/2004 | McGraw et al. |
| 2004/0230544 A1 | 11/2004 | Herbert |
| 2004/0236938 A1 | 11/2004 | Callaghan |
| 2004/0241424 A1 | 12/2004 | Barbera-Guillem |
| 2004/0254808 A1 | 12/2004 | Bennett et al. |
| 2004/0254898 A1 | 12/2004 | Parker et al. |
| 2005/0033653 A1 | 2/2005 | Eisenberg et al. |
| 2005/0065892 A1 | 3/2005 | Ryan et al. |
| 2005/0065896 A1 | 3/2005 | Kummer et al. |
| 2005/0065897 A1 | 3/2005 | Ryan et al. |
| 2005/0065898 A1 | 3/2005 | Elliot et al. |
| 2005/0071244 A1 | 3/2005 | Phillips et al. |
| 2005/0071296 A1 | 3/2005 | Lepkofker |
| 2005/0071297 A1 | 3/2005 | Kara |
| 2005/0075991 A1 | 4/2005 | Ogg |
| 2005/0077346 A1 | 4/2005 | Dutta et al. |
| 2005/0080751 A1 | 4/2005 | Burningham |
| 2005/0082818 A1 | 4/2005 | Mertens |
| 2005/0087605 A1 | 4/2005 | Auslander et al. |
| 2005/0114222 A1 | 5/2005 | Mundy |
| 2005/0114276 A1 | 5/2005 | Hunter et al. |
| 2005/0116047 A1 | 6/2005 | Lu et al. |
| 2005/0119786 A1 | 6/2005 | Kadaba |
| 2005/0137949 A1 | 6/2005 | Rittman et al. |
| 2005/0171791 A1 | 8/2005 | Chimenti et al. |
| 2005/0171869 A1 | 8/2005 | Minnocci |
| 2005/0192899 A1 | 9/2005 | Reardon |
| 2005/0192911 A1 | 9/2005 | Mattern |
| 2005/0192913 A1 | 9/2005 | Lubart |
| 2005/0195214 A1 | 9/2005 | Reid et al. |
| 2005/0209913 A1 | 9/2005 | Wied et al. |
| 2005/0237203 A1 | 10/2005 | Burman et al. |
| 2005/0256811 A1 | 11/2005 | Pagel et al. |
| 2005/0278263 A1 | 12/2005 | Hollander et al. |
| 2005/0278266 A1 | 12/2005 | Ogg et al. |

(56) References Cited

U.S. PATENT DOCUMENTS

| | | |
|---|---|---|
| 2006/0000648 A1 | 1/2006 | Galtier |
| 2006/0020505 A1 | 1/2006 | Whitehouse |
| 2006/0036557 A1 | 2/2006 | Mattern |
| 2006/0116971 A1 | 6/2006 | Beckstrom et al. |
| 2006/0118631 A1 | 6/2006 | Lubow et al. |
| 2006/0122947 A1 | 6/2006 | Poulin |
| 2006/0136347 A1 | 6/2006 | Reichelsheimer et al. |
| 2006/0173700 A1 | 8/2006 | Fenelon |
| 2006/0173796 A1 | 8/2006 | Kara |
| 2006/0190418 A1 | 8/2006 | Huberty et al. |
| 2006/0220298 A1 | 10/2006 | Fairweather et al. |
| 2006/0230000 A1 | 10/2006 | Lubinger |
| 2006/0238334 A1 | 10/2006 | Mangan et al. |
| 2006/0259390 A1 | 11/2006 | Rosenberger |
| 2006/0282271 A1 | 12/2006 | Ananda et al. |
| 2006/0283943 A1 | 12/2006 | Ostrowski et al. |
| 2006/0287096 A1 | 12/2006 | O'Kelley, II et al. |
| 2006/0293907 A1 | 12/2006 | Castineiras |
| 2007/0005376 A1 | 1/2007 | Ryan |
| 2007/0005518 A1 | 1/2007 | Beckstrom et al. |
| 2007/0011995 A1 | 1/2007 | Weaver et al. |
| 2007/0017985 A1 | 1/2007 | Lapstun et al. |
| 2007/0033110 A1 | 2/2007 | Philipp et al. |
| 2007/0067248 A1 | 3/2007 | Fabien |
| 2007/0073587 A1 | 3/2007 | Walker et al. |
| 2007/0078795 A1 | 4/2007 | Chatte |
| 2007/0080228 A1 | 4/2007 | Knowles et al. |
| 2007/0100672 A1 | 5/2007 | McBride et al. |
| 2007/0174213 A1 | 7/2007 | Whitehouse et al. |
| 2007/0174215 A1 | 7/2007 | Morel |
| 2007/0179853 A1 | 8/2007 | Feige et al. |
| 2007/0185726 A1 | 8/2007 | Stickler et al. |
| 2007/0198441 A1 | 8/2007 | Kara |
| 2007/0253350 A1 | 11/2007 | Tung et al. |
| 2007/0255664 A1 | 11/2007 | Blumberg et al. |
| 2008/0046384 A1 | 2/2008 | Braun et al. |
| 2008/0071636 A1 | 3/2008 | Chatte |
| 2008/0154781 A1 | 6/2008 | Kumar |
| 2008/0281719 A1 | 11/2008 | Hall et al. |
| 2009/0125561 A1 | 5/2009 | Garcia |
| 2009/0164392 A1 | 6/2009 | Raju et al. |
| 2009/0171848 A1 | 7/2009 | Wronski, Jr. et al. |
| 2009/0171861 A1 | 7/2009 | Horree et al. |
| 2009/0212098 A1 | 8/2009 | Stratton et al. |
| 2010/0169241 A1 | 7/2010 | Schoonmaker et al. |
| 2010/0235267 A1 | 9/2010 | Brookner et al. |
| 2010/0298662 A1 | 11/2010 | Yu et al. |
| 2010/0312627 A1 | 12/2010 | Khechef et al. |
| 2011/0015935 A1 | 1/2011 | Montgomery et al. |
| 2011/0022544 A1 | 1/2011 | Kim et al. |
| 2011/0029429 A1 | 2/2011 | Whitehouse |
| 2011/0071944 A1 | 3/2011 | Heiden et al. |
| 2011/0145107 A1 | 6/2011 | Greco |
| 2011/0204132 A1 | 8/2011 | Vera |
| 2011/0225180 A1 | 9/2011 | Liao et al. |
| 2011/0242554 A1 | 10/2011 | Farry et al. |
| 2011/0295646 A1 | 12/2011 | Barros |
| 2012/0008766 A1 | 1/2012 | Robertson et al. |
| 2012/0159603 A1 | 6/2012 | Queck |
| 2012/0233252 A1 | 9/2012 | Vats et al. |
| 2012/0240204 A1 | 9/2012 | Bhatnagar et al. |
| 2013/0066794 A1 | 3/2013 | Hill et al. |
| 2013/0254132 A1 | 9/2013 | Srinath et al. |
| 2014/0019517 A1 | 1/2014 | Fawcett |
| 2014/0067665 A1 | 3/2014 | Paletz et al. |
| 2014/0265300 A1 | 9/2014 | Jena |
| 2014/0324633 A1 | 10/2014 | Pollak et al. |

FOREIGN PATENT DOCUMENTS

| | | |
|---|---|---|
| DE | 3903718 A1 | 8/1989 |
| DE | 4409386 A1 | 9/1995 |
| EP | 0137737 A2 | 4/1985 |
| EP | 153816 A2 | 9/1985 |
| EP | 0282359 A2 | 9/1988 |
| EP | 0507562 A2 | 10/1992 |
| EP | 0571259 A1 | 11/1993 |
| EP | 0596706 A1 | 5/1994 |
| EP | 0658861 A1 | 6/1995 |
| EP | 0782111 | 7/1997 |
| EP | 0900830 A1 | 3/1999 |
| EP | 0927958 A2 | 7/1999 |
| EP | 0927963 A2 | 7/1999 |
| EP | 1096429 A2 | 5/2001 |
| EP | 1525994 A2 | 4/2005 |
| FR | 2580844 A1 | 10/1986 |
| GB | 2246929 A | 2/1992 |
| GB | 2251210 A | 7/1992 |
| GB | 2271452 A | 4/1994 |
| JP | 63-147673 | 6/1988 |
| JP | 04-284558 B2 | 10/1992 |
| JP | 05-132049 B2 | 5/1993 |
| JP | 09-508220 | 8/1997 |
| JP | 11-249205 B2 | 9/1999 |
| JP | 2000-105845 A | 4/2000 |
| JP | 2005-215905 A | 8/2005 |
| WO | WO-88/01818 A1 | 3/1988 |
| WO | WO-94/27258 A1 | 11/1994 |
| WO | WO-95/17732 | 6/1995 |
| WO | WO-1995/19016 A2 | 7/1995 |
| WO | WO-97/14085 | 4/1997 |
| WO | WO-97/14117 A2 | 4/1997 |
| WO | WO-97/40472 A1 | 10/1997 |
| WO | WO-98/14907 A2 | 4/1998 |
| WO | WO-98/14909 A2 | 4/1998 |
| WO | WO-98/57302 A1 | 12/1998 |
| WO | WO-98/57460 A1 | 12/1998 |
| WO | WO-99/48054 A1 | 9/1999 |
| WO | WO-02/063517 A2 | 8/2002 |
| WO | WO-02/093498 A2 | 11/2002 |
| WO | WO-03/039051 A2 | 5/2003 |
| WO | WO-03/083784 A1 | 10/2003 |
| WO | WO-2005/042645 A2 | 5/2005 |
| WO | WO-2005/060590 A2 | 7/2005 |

OTHER PUBLICATIONS

Bleumer, G. Electronic Postage Systems, Springer, 2007, 263 pages.
U.S. Appl. No. 09/491,949, Salim G. Kara.
U.S. Appl. No. 10/862,058, Pagel et al.
U.S. Appl. No. 11/353,690, Kara.
U.S. Appl. No. 11/509,309, J. P. Leon.
U.S. Appl. No. 11/616,546, Bussell et al.
U.S. Appl. No. 11/616,569, Tsuie et al.
U.S. Appl. No. 11/729,148, Leon et al.
U.S. Appl. No. 12/030,739, McBride et al.
U.S. Appl. No. 12/103,496, Bortnak et al.
U.S. Appl. No. 12/316,240, Leon.
U.S. Appl. No. 12/553,824, Bortnak et al.
"Mobile Postage stamps via text message announced", http://telecoms.cytalk.com/2011/03/mobile-postage-stamps-via-text-messages-announced/, CY.TALK Telecoms News Blog, Mar. 14, 2011 in Telecoms, Texting, pp. 1-9.
Ford, C., "Frequent Flyer Programs," Australian Accountant, 63,1, Feb. 1993, pp. 52-58, 7 pages.
Alexander, K.L., "U.S. Stamps Pay Tribute to Starry-Eyed Jurors," Final Edition, Calgary Herald, Calgary, Alberta, Canada, Sep. 14, 2007, 2 pages.
"Domestic Mail Manual Section 604," United States Postal Service, Aug. 31, 2005, 45 pages.
Anonymous, "Automated Indicia Detection System From Parascript Protects Postage Revenue for Postal Operators, Cracks Down on Fraud: —Parascript StampVerify Simplifies Complex Task of Automatically Locating and Verifying Different Types of Indicia on Envelope Images—," PR Newswire, New York, Sep. 18, 2007, 2 pages.
Stump, Jake, "Postal Service to Remove Stamp Machines Across the Country: They Broke Down Often and Were Hard to Repair, Official Says," Charleston Daily Mail, C1, Charleston, WV, Charleston Newspapers, Mar. 19, 2008.

(56) References Cited

OTHER PUBLICATIONS

Martorelli, Business Reply Mail, Winton M. Blount Postal History Symposium, Sep. 2011, 13 pages.
Mobile Postage Stamps Via Text Messages Announced, Phone Reviews, Mobile Phones, News, Mar. 11, 2011, pp. 1-3.
Unpublished U.S. Appl. No. 12/103,496 to Bortnak et al., filed Apr. 15, 2008 and entitled "Systems and Methods for Activation of Postage Indicia at Point of Sale," 40 pages.
Unpublished U.S. Appl. No. 11/509,309 to Leon filed Aug. 24, 2006 and entitled "Invisible Fluorescent Ink Mark," 15 pages.
Unpublished U.S. Appl. No. 12/030,739 to McBride et al. filed Feb. 13, 2008 and entitled "Systems and Methods for Distributed Activation of Postage," 35 pages.
Tygar, J.D.et al., "Cryptography: It's Not Just For *Electronic* Mail Anymore," School of Computer Science, Carnegie Mellon University, Pittsburg, PA, Mar. 1, 1993, 23 pages.
"Miniature, Coin-Shaped Chip is Read or Written with a Touch," News Release, Dallas Semiconductor, Jul. 1991, 9 pages.
International Search Report for PCT/US96/16366, dated Jun. 13, 1997, 9 pages.
Terrell, K, "Licking Stamps: A PC and a Printer Will End Trips to the Post Office," U.S. News & World Report, Sep. 28, 1998, vol. 125, No. 12, 4 pages.
Computergram International, "U.S. Postal Service to Introduce PC Postage Plans Today," Aug. 9, 1999, No. 3720, 1 page.
Minnick, R. "Postage Imprinting Apparatus and Methods for Use With a Computer Printer," Apr. 27, 1995, 71 pages.
Office Action dated Mar. 13, 2007 for JP 515,253/97; with English language translation (4 pages).
English translation of German Office Action issued for DE 195 49 613.2 and German Office Action, dated Mar. 29, 2001, pp. 10.
Unpublished U.S. Appl. No. 11/323,463 to Leon et al. filed Dec. 30, 2005 and entitled "Systems and Methods for Single Pass Printing Postage Indicia," 23 pages.
Unpublished U.S. Appl. No. 10/606,579 to Ogg, filed Jun. 26, 2003 and entitled "System and Method for Automatically Processing Mail," 15 pages.
International Search Report issued for PCT/US95/00237, dated May 29, 1995, 4 pages.
"Information-Based Indicia Program (IBIP) Performance Criteria for Information-Based Indicia and Security Architecture for Open IBI Postage Evidencing Systems," Feb. 23, 2000, The United States Postal Service (USPS), 76 pages.
Pintsov, L. et al. "Postal Revenue Collection in the Digital Age," Springer, Berlin/Heidelberg, Financial Cryptography, Jan. 1, 2001, 3 pages.
"Royal Mail Posts Out New Look Stamp Books Created by CDT Design," Design Week, Jul. 4, 2002, 2 pages.
Brief English Translation of Office Action Issued for DE 195 49 613.2 and German Office Action dated Nov. 20, 2007, 6 pages.
U.S. Appl. No. 11/114,964 to Clem et al., filed Apr. 25, 2005, and entitled "Quality Assurance of Image-Customization of Computer-Based Value-Bearing Items," 122 pages.
U.S. Appl. No. 10/994,914 to McBride et al., filed Nov. 22, 2004, and entitled "Customized Computer-Based Value-Bearing Item Quality Assurance," 131 pages.
U.S. Appl. No. 10/994,728 to Huebner et al., filed Nov. 22, 2004, and entitled "Printing of Computer-Based Value-Bearing Items," 122 pages.
U.S. Appl. No. 10/994,698 to Leon et al., filed Nov. 22, 2004, and entitled "Image Customization of Computer-Based Value-Bearing Items," 126 pages.
Unpublished U.S. Appl. No. 10/643,745 to Ogg et al., filed Aug. 19, 2003 and entitled "System and Method for Dynamically Partitioning a Postage Evidencing System," 20 pages.

Brown, B., "Internet Postage Services," PC Magazine, Jun. 6, 2000, p. 133, Ziff-Davis Publishing Company, 1 page.
"Zazzle® Offers Zazzle Custom Stamps™ for Business," May 17, 2006, https://www.zazzle.com/about/press/releases?pr=12624, 2 pages.
Porter, William, "Canadians Take to Vanity Stamps in Very Big Way," Denver Post, Jul. 9, 2000, 2 pages.
Derrick, J. "The Meter is Running," Office Systems, vol. 11 No. 9, Sep. 1994, 6 pages.
"Endicia Announces PictureItPostage™," Jun. 6, 2005, http://www.endicia.com/-/media/Files/About%20Us/Press%20Room/Endicia_pr05-06-06.ashx>, 2 pages.
Ralph, J. "What's Selling: From Bricks and Mortar to Bricks and Clicks," Playthings Magazine, Feb. 1, 2003, 4 pages.
Menezes, A.J. et al., "Handbook of Applied Cryptography," CRC Press LLC, 1997 (Excerpt—Cover pp. and pp. 512-515), 22 pages.
"Information-Based Indicia Program (IBIP) Performance Criteria for Information-Based Indicia and Security Architecture for Closed IBI Postage Metering Systems (PCIBI-C)," Jan. 12, 1999, The United States Postal Service (USPS), 49 pages.
Stamps: Beyond Elvis, May 15, 1994, New York Times Archives, 2 pages.
Office Action issued for Japanese Patent Application No. 515,253/1997, dated Apr. 21, 2009; 5 pages (with English language translation).
U.S. Appl. No. 11/435,453 to Clem, filed May 16, 2006, and entitled "Rolls of Image-Customized Value-Bearing Items and Systems and Methods for Providing Rolls of Image-Customized Value-Bearing Items," 69 pages.
U.S. Appl. No. 11/644,458 to Leon, filed Dec. 20, 2006, and entitled "Systems and Methods for Creating and Providing Shape-Customized, Computer-Based, Value-Bearing Items," 77 pages.
U.S. Appl. No. 11/729,239 to Leon et al., filed Mar. 28, 2007 and entitled "Computer-Based Value-Bearing Item Customization Security," 131 pages.
U.S. Appl. No. 12/316,240 to Leon, filed Dec. 9, 2008, and entitled "Systems and Methods for Facilitating Replacement of Computer-Based Value-Bearing Items," 158 pages.
U.S. Appl. No. 12/500,970 to Clem, filed Jul. 10, 2009, and entitled "Automatic Guarantee Delivery Tracking and Reporting for United States Postal Service Postage Refunds for Paid Computer-Based Postage," 70 pages.
U.S. Appl. No. 12/943,519 to Clem, filed Nov. 10, 2010, and entitled "Rolls Of Image-Customized Value-Bearing Items And Systems And Methods For Providing Rolls Of Image-Customized Value-Bearing Items," 65 pages.
U.S. Appl. No. 13/038,029 to Leon et al, filed Mar. 1, 2011 and entitled "Image-Customization of Computer-Based Value-Bearing Items," 131 pages.
U.S. Appl. No. 13/081,356 to Leon et al, filed Apr. 6, 2011 and entitled "Computer-Based Value-Bearing Item Customization Security," 136 pages.
International Search Report attached to PCT Application WO/88/01818, dated Nov. 30, 1987, 2 pages.
International Search Report issued for Application PCT/US96/16366, dated Jun. 13, 1997, 9 pages.
Davies, Brad L. "Printing System for Preventing Injustice by Delivering Print Data from Postal Charge Meter to Printer," Jan. 2001, 1 page.
Unpublished U.S. Appl. No. 13/172,066 to McBride et al., filed Jun. 29, 2011 and entitled "Systems and Methods Using Mobile Communication Handsets for Providing Postage," 50 pages.
Unpublished U.S. Appl. No. 13/286,854 to Crouse et al., filed Nov. 1, 2011 and entitled "Perpetual Value Bearing Shipping Labels," 49 pages.
Feare, Tom, "Shipping System Saves $2 Million Yearly," Modern Materials Handling, Aug. 2000, 55, 9; pp. A6-A7.
Domestic Mail Manual Section 604, Aug. 31, 2005.

SYSTEMS AND METHODS USING MOBILE COMMUNICATION HANDSETS FOR PROVIDING POSTAGE

CROSS-REFERENCE TO RELATED APPLICATIONS

The present application is a continuation of U.S. patent application Ser. No. 13/110,476 entitled "Systems and Methods Using Mobile Communication Handsets for Providing Postage," filed May 19, 2011, which is related to commonly assigned U.S. patent application Ser. No. 11/616,546 entitled "System and Method for Handling Payment Errors with Respect to Delivery Services," filed Dec. 27, 2006 and issued Dec. 17, 2013 as U.S. Pat. No. 8,612,361, Ser. No. 11/616,569 entitled "Postage Metering with Accumulated Postage," filed Dec. 27, 2006 and issued Jul. 8, 2014 as U.S. Pat. No. 8,775,331, Ser. No. 12/030,739 entitled "Systems and Methods for Distributed Activation of Postage," filed Feb. 13, 2008 and issued Aug. 6, 2019 as U.S. Pat. No. 10,373,398, Ser. No. 12/103,496 entitled "Systems and methods for Activation of Postage Indicia at Point of Sale," filed Apr. 15, 2008 and issued May 22, 2018 as U.S. Pat. No. 9,978,185, Ser. No. 12/553,824 entitled "Systems and methods for Payment of postage indicia After the Point of Generation," filed Sep. 3, 2009 and issued Dec. 8, 2015 as U.S. Pat. No. 9,208,620, Ser. No. 11/729,148 entitled "Computer-Based Value-Bearing Item Customization Security," filed Mar. 27, 2007, and Ser. No. 12/316,240 entitled "Systems and Methods for Facilitating Replacement of Computer-Based Value-Bearing Items," filed Dec. 9, 2008 and issued Jan. 24, 2012 as U.S. Pat. No. 8,100,324, the disclosures of which are hereby incorporated herein by reference in their entirety.

TECHNICAL FIELD

The present invention relates to postage indicia and, more particularly, to providing postage indicia using mobile communication handsets.

BACKGROUND OF THE INVENTION

The use of postage indicia in place of traditional postage stamps has become wide spread. Dedicated postage meters, for example, configured to strike postage indicia imprints upon envelopes and labels have been in use for many years. Such postage meters include a postage value vault and controlled printing mechanism which will strike postage indicia and debit a corresponding amount of value from the postage value vault under control of user input. The postage meters are typically somewhat bulky due at least in part to the security measures implemented to thwart fraudulent postage indicia strikes. Moreover, obtaining postage value credit refill is often a complicated and cumbersome task. Accordingly, the use and management of such postage meters is less than ideal for many users.

Solutions for generating and printing valid postage indicia using a home or office processor-based system, such as a personal computer (PC), have been provided by Stamps.com Inc., Los Angeles, Calif. (the assignee of the present application) for a number of years. The postage indicia generated by such processor-based systems has typically been an information based indicia (IBI), wherein a barcode (e.g., two-dimensional barcode) carries information useful for validating the indicia when placed in the mail stream. Such solutions have facilitated ad-hoc generation and printing of postage indicia, such as to generate and print individual postage indicia for a particular mail piece. Although providing significantly more convenience than traditional postage meters for many users, these processor-based systems continue to utilize relatively bulky printers (e.g., ink jet or laser printers) for imprinting postage indicia upon an envelope or label.

Although providing a very convenient solution for providing valid postage to individuals and businesses upon demand, 24 hours a day, 7 days a week, the foregoing solutions may not address every situation. For example, a user may not utilize a sufficient amount of postage to justify the lease of a traditional postage meter or otherwise may not wish to obtain and manage such a dedicated use system. A user may not be comfortable with processor-based technology and thus be reluctant to utilize PC based postage systems to generate and print postage. A user, although regularly using such processor-based system, may have insufficient supplies on hand (e.g., label stock, printer ink/toner, etc.) to print postage indicia. Similarly, a user may be traveling and thus not have a postage meter, PC based postage system, or even a suitable printer available for their use in generating and printing postage indicia.

Even where a user has access to the appropriate equipment for generating and printing postage indicia, such solutions may not be ideal for the user. For example, the generation of postage indicia is typically preceded by debiting the user's postage value account (e.g., the aforementioned postage value vault) in order to prevent the printing of valuable postage indicia without proper payment for that value. However, should a postage meter print mechanism malfunction, a host PC processor cease to operate, an envelope or label be positioned improperly, etc. a postage indicia misprint may occur. The user is then typically put to the task of proving that a misprint has occurred in order to receive a refund of the associated value. Issues such as this can result in some users resisting adoption of the foregoing metering technology.

Techniques for batch generation and printing of postage indicia, such as to generate and print plural postage indicia for later use with various mail pieces, have been provided which can provide a suitable solution for some users. For example, a user may utilize a web interface provided by Stamps.com Inc. to generate and print a sheet of "generic" postage indicia, perhaps using uniquely serialized stock, for use with mail pieces much like a more traditional sheet of stamps may be used. Such generic postage indicia is not linked to a particular mail piece and thus may be used with any appropriate mail piece as needed. However, the postage indicia would be provided in some standard denomination(s) which may not be correct for a particular mail piece. This can lead to returned mail due to under payment or loss of value due to over payment. Moreover, the postage indicia, once generated, have value and are subject to inappropriate use and pilferage.

BRIEF SUMMARY OF THE INVENTION

The present invention is directed to systems and methods which provide postage indicia using mobile communication handsets. According to embodiments of the invention, users are enabled to introduce mail pieces into a mail delivery stream which are accepted as having acceptable (e.g., activated or activatable), postage indicia having value associated therewith without the use of traditional metering systems, processor-based postage generation and printing systems, or even printers. Instead, a token comprising substantially unique identification information identifying a mail piece (e.g., letter, envelope, package, etc.), whether in the form of a symbol (e.g., barcode, character string, etc.) preprinted upon a portion of a mail piece (e.g., label, envelope, letter, etc.), and/or a code or symbol added to (e.g., handwritten upon) a portion of a mail piece or derived from a mail piece itself (e.g., an image, image hash, etc.) is activated as an activated token having a postage indicium or postage indicium information comprising value (referred to herein as postage value) associated therewith using mobile communication handsets, such as a smart phone, network enabled personal digital assistant, etc. according to embodiments of the invention.

In operation according to preferred embodiments, an account (e.g., user's postage account, user's mobile communication handset account, user' prepaid account, user's postpaid account, etc.) is debited by an amount appropriate to the postage value. Such postage value, and the corresponding account debit, may be in any value according to embodiments of the invention, such as a value selected by the user, a value determined to be appropriate to the mail piece, a value calculated to provide for both a postage fee and a service fee, etc. Information identifying an appropriate account may be provided to an activation system in or accompanying a token. For example, a token used for activation as a postage indicium may include account information (e.g., user identification information, mobile communication handset identification information, account identification information, etc.) therein. Additionally or alternatively, such account information may be provided separate from the token itself.

Operation of a configuration herein provides for generation and printing of tokens that are not yet activated (therefore not yet associated with postage value) that are later activated and thereby converted from an unactivated token into an activated token having postage value associated therewith. Such unactivated tokens may be printed upon mail stock (e.g., envelopes, flats, boxes, etc.), document stock (e.g., letter stock), labels (e.g., postage indicia labels, address labels, etc.), and/or the like for inclusion with or as a mail piece. Such unactivated tokens may comprise a portion of a mail piece (e.g., a face of the mail piece, or some portion thereof, including all the contents thereon). Activation of tokens is accomplished according to embodiments through use of a mobile communication handset. For example, an imaging apparatus (e.g., camera, barcode reader, etc.) of the mobile communication handset may be operated to photograph an unactivated token, communicate information regarding that token (e.g., the image, data derived from the image, etc.) to an activation system using a network interface of the mobile communication handset, and cause the unactivated token to be activated and have a postage value (e.g., as may be indicated by an associated postage indicium or postage indicium information) associated therewith. Such an activated token, with its associated postage value, is acceptable to a mail delivery service (e.g., the United States Postal Service (USPS)) for delivery of the mail piece.

Activation of tokens through use of a mobile communication handset according to embodiments of the invention may provide activation of tokens as value bearing postage indicia at various times other than when imaging apparatus of the mobile communication handset communicates information regarding a token to an activation system. For example, an imaging apparatus (e.g., camera, barcode reader, etc.) of the mobile communication handset may be operated to photograph an unactivated token, communicate information regarding that token (e.g., the image, data derived from the image, etc.) along with account information (e.g., user identification information, mobile communication handset identification information, account identification information, etc.) to an activation system using a network interface of the mobile communication handset. Thereafter, when the mail piece is processed by a postal service information regarding the token thereon (e.g., an image of the token, data derived from an image of the token, etc.) acquired by postal service processing equipment may to analyze token information provided by users and determine an appropriate account for use in activating the token, and thus cause the unactivated token to be activated and have a postage value (e.g., as may be indicated by an associated postage indicium or postage indicium information) associated therewith.

Operation according to other exemplary configurations may utilize a token comprising substantially unique information identifying or otherwise associated with a mail piece, in addition to or in the alternative to the aforementioned preprinted tokens, in providing postage indicia using mobile communication handsets. Such tokens may comprise substantially unique information which is applied upon a mail piece by a user. Accordingly, a user may utilize a mobile communication handset to request a postage indicium for a mail piece. For example, the user may use a short message service (SMS), electronic mail, or other communication resource of the mobile communication handset to communicate a request for a postage indicium to an activation system. According to embodiments, an imaging apparatus of the mobile communication handset may be operated to photograph a portion of the mail piece (e.g., front face of the mail piece) for communication of information regarding the mail piece (e.g., the image, data derived from the image, etc.) to the activation system as a request for a postage indicium. In operation according to embodiments, the activation system generates a token comprising substantially unique information for the mail piece and provides this token to the user (e.g., through the mobile communication handset) for application upon the mail piece (e.g., handwritten upon the mail piece) as an activated token having postage value associated therewith.

Operation according to yet another exemplary configuration herein provides a token comprising substantially unique information derived from the mail piece itself. For example, an imaging apparatus of the mobile communication handset may be operated to photograph a portion of the mail piece (e.g., front face having address information imprinted thereon), communicate information regarding the mail piece (e.g., the image, data derived from the image, etc.) to an activation system, and cause the portion of the mail piece to be activated as a token having postage value associated therewith. The substantially unique information derived from the mail piece may include information provided by a user (e.g., handwritten on the mail piece, preprinted on the mail piece, etc.) for use in providing activation of postage indicia according to embodiments herein. For example, account information (e.g., user identification information, mobile communication handset identification information, account identification information, etc., or some portion thereof) may be included on the mail piece for use in an debiting an account (e.g., the user's postage account, user's cell phone account, etc.) by an amount appropriate to the postage value.

Activation of postage in accordance with embodiments herein may utilize various techniques to determine an appropriate amount for the postage value. For example, rather than a user inputting a desired amount of postage, the mobile communication handset and/or the activation system may operate to calculate the appropriate amount of postage. In some embodiments, mobile communication handsets may be provided with postal scale circuitry to provide mail piece weight for use in providing postage indicia. In operation according to embodiments of the invention, information from the mail piece itself (e.g., as may be determined from one or more image of the mail piece contents) may be utilized by logic of the mobile communication handset and/or activation system in determining an appropriate amount of postage value for a postage indicium activated according to the concepts herein.

Irrespective of which of the configurations herein is employed to provide postage indicia, it should be appreciated that standard, commercially available, widely used mobile communication handsets may be utilized. Accordingly, a large percentage of the population, whether at home, in the office, or traveling, may be enabled to obtain postage on demand using systems and methods of the present invention.

It should be appreciated that although mobile communication handsets in their "off-the-shelf" state may be utilized in providing postage indicia according to embodiments of the invention, added logic and/or circuitry may be utilized according to alternative embodiments. For example, postage indicia acquisition logic (e.g., in the form of a smart phone application) may be provided for a smart phone type mobile communication handset which automates token activation operation as described herein. Additionally or alternatively, the aforementioned postal scale circuitry (e.g., in the form of a scale dongle, sleeve, etc. connectable to a data interface of the mobile communication handset) may be provided for a smart phone type mobile communication handset to provide mail piece weight for use in providing postage indicia.

Tokens utilized according to embodiments of the invention for providing postage indicia may be processed in a number of ways once introduced into the mail stream. For example, an open loop technique may be implemented with respect to certain tokens whereby the tokens are scanned by a validation system and the mail piece allowed to continue in the mail stream. The token may subsequently be analyzed, such as by the validation system and/or an activation system, to determine if appropriate postage value (e.g., as indicated by an associated postage indicium or postage indicium information) is associated therewith. If no postage value, or if a deficient postage value, is associated with the token an appropriate account may be debited accordingly. Additionally or alternatively, a closed loop technique may be implemented with respect to certain tokens whereby the tokens are scanned by a validation system and the mail piece not allowed to continue in the mail stream until the token is analyzed. For example, the token may be analyzed, such as by the validation system and/or an activation system, to determine if appropriate postage value (e.g., as indicated by an associated postage indicium or postage indicium information) is associated therewith. If appropriate postage value is associated with the token the mail piece may be allowed to continue in the mail stream. However, if a no postage value, or if a deficient postage value, is associated with the token the mail piece may be prevented from continuing in the mail stream (e.g., returned to the sender).

The unique information of the tokens and/or the mobile communication handsets may be utilized to facilitate enhanced services according embodiments of the invention. For example, associating preprinted unactivated tokens with a particular user or user account may be utilized to facilitate payment for postage, and thus activation of the token, after a mail piece is introduced into the mail stream (e.g., if a user inadvertently fails to activate the token prior to introducing the mail piece into the mail stream). The use of a mobile communication handset in activating a token provides information regarding how the user may contacted, such as for automatically providing tracking information, delivery notification, etc.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

DETAILED DESCRIPTION OF THE INVENTION

Figure 1A:
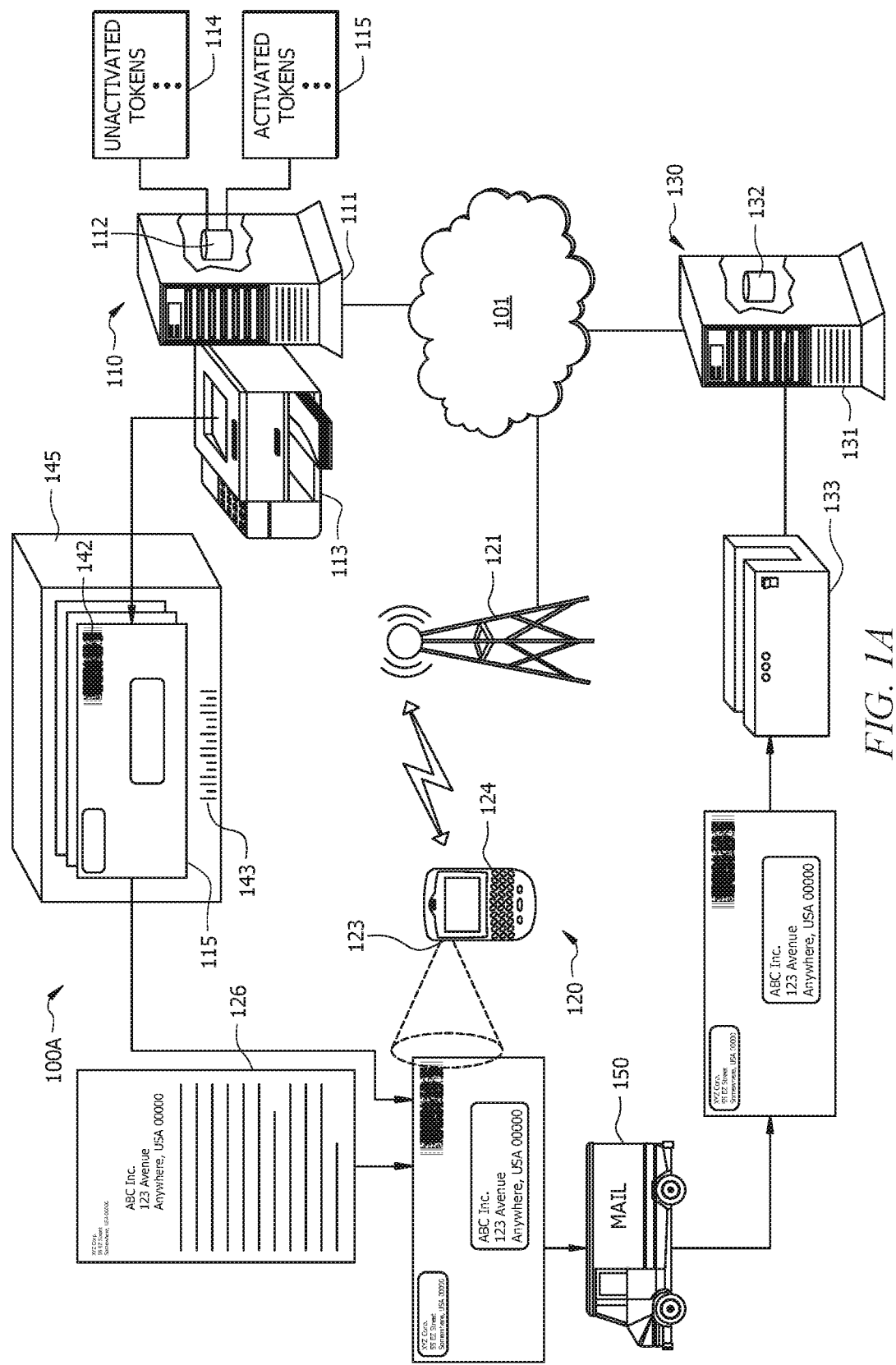
FIGS. 1A and 1B show systems adapted to provide activation of postage using a mobile communication handset according to embodiments of the present invention.
Figure 1B:
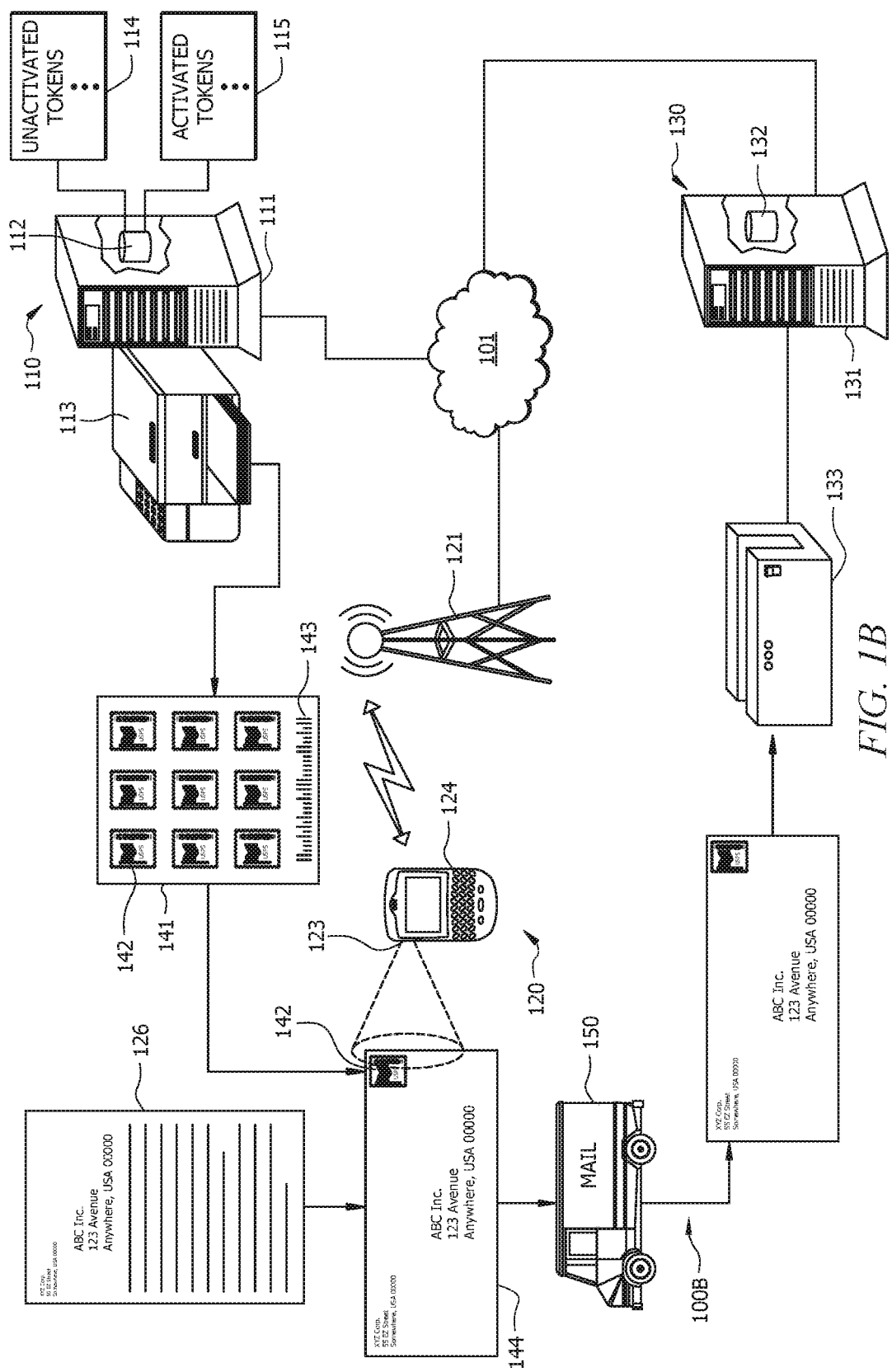

Directing attention to FIGS. 1A and 1B, systems adapted to provide activation of postage indicia using mobile communication handsets according to embodiments of the invention are shown as systems 100A and 100B respectively. Systems 100 of the illustrated embodiments comprises activation system 110, communication system 120, and validation system 130, in communication through network 101, cooperating to provide postage indicia.

Network 101 of the illustrated embodiments provides information communication between activation system 110, communication system 120, and validation system 130. The foregoing systems may be disposed locally or remotely with respect to one another. For example, activation system 110 and validation system 130 may be disposed locally with respect to each other (e.g., at a postal system facility), whereas communication system 120 may be disposed remotely with respect to activation system 110 and validation system 130. Of course, activation system 110 and validation system 130 may be disposed remotely with respect to each other, if desired. Accordingly, network 101 of embodiments may comprise the Internet, an intranet, an extranet, a local area network (LAN), a metropolitan area network (MAN), a wide area network (WAN), the public switched telephone network (PSTN), a wireless network, a cable transmission system, a satellite communication network, and/or the like.

Activation system 110 preferably comprises a processor-based system, such as a computer having a central processing unit (CPU), memory (shown as including database 112), and appropriate input/output (I/O) devices and interfaces, operable under control of an instruction set defining operation as described herein. For example, activation system 110 may comprise server platform 111 having a processor from the CORE family of processors available from Intel Corporation, Santa Clara, Calif. Activation system 110 of the illustrated embodiment provides generation, printing, and activation of tokens for use in providing postage indicia as described below. Accordingly, activation system 110 of the illustrated embodiments includes database 112 for storage of token identification and status (e.g., as may be provided in unactivated token database 114 and activated token database 115) and printer 113 for printing tokens on mail stock, such as may comprise envelopes, labels, sheets of paper, etc.

Activation system 110 of embodiments may provide unactivated tokens for providing postage indicia according to the concepts herein in a number of configurations. For example, as shown in the embodiment illustrated in FIG. 1A, tokens 142 may be preprinted upon envelope stock, such as envelope 144. Such envelope stock bearing preprinted, unactivated tokens may be provided in bulk quantities (e.g., 25, 50, 100, 250, 500, etc. count packages) for distribution to users for their use as mail pieces. Additionally or alternatively, as shown in the embodiment illustrated in FIG. 1B, tokens 142 may be preprinted upon label stock, such as postage stock 141. Such label stock bearing preprinted may be provided for distribution to users for their application to mail pieces.

Tokens 142 of embodiments comprise various forms of symbols (e.g., barcodes, character strings, etc.) and provide substantially unique identification information. Substantially unique information as used herein means that the information is unique in normal use of the tokens. For example, after a period of time (e.g. days, months, or years) sufficient for operation as described herein, the information may repeat. Alternatively, the information may repeat after a certain amount of different number combinations have been used. Accordingly, a user may be confident that the information will identify only one token at a given time.

The aforementioned tokens and/or addition or alternative items may be printed using special inks. For example, special ink colors (e.g., unique colored inks, inks which appear to shift color in changing light or viewing angles, etc.) and/or inks having special properties (e.g., fluorescent inks, phosphorescent inks, thermochromatic inks, magnetic inks, bi-stable inks, etc.) may be used in printing a token, or some portion thereof, such as to discourage counterfeiting, reproduction, etc. Additionally or alternatively, printed items as may be utilized according to embodiments of the invention, such as facing identification marks (FIMs), user or account identification information, etc., may be printed using such special inks. It should be appreciated, however, that embodiments of the invention may utilize more traditional inks for printing tokens and/or additional or alternative printed items, as appropriate.

Activation system 110 preferably records the foregoing unique identification information of tokens 142 for use in indicating unactivated and activated states of the particular tokens. For example, when initially generated and unactivated, the substantially unique identification information of tokens 142 may be stored in database 112, such as part of the data of unactivated tokens database 114. Once a token is activated, however, the substantially unique identification information of a token is stored in activated tokens database 115, such as for use by validation system 130 in determining if postage value is associated with a particular token. Accordingly, as part of an activation process, substantially unique identification information for a previously unactivated token may be moved from unactivated tokens database 114 to activated tokens database 115.

Although embodiments of tokens 142 themselves provide substantially unique identification, substantially unique identification of bulk mail stock packages may be utilized to expedite identification of the particular unactivated tokens provided to a user in bulk. For example, code 143 as may be applied to package 145 containing a bulk quantity of mail stock to expeditiously identify a range of unactivated tokens provided to a particular user. For example, code 143 included on postage stock 141 or package 145 may include a serial or sequence number, identification information, digital signature, cryptographic key, and/or the like useful in uniquely identifying the mail stock and/or tokens 142 printed thereon. Activation system 110 preferably records such identification information in database 112, such as part of the data of unactivated tokens database 114, for use in activating the postage indicia.

Although shown as a single system for simplicity, activation system 110 of embodiments may be implemented as a plurality of platforms. For example, separate platforms may be used to generate and print unactivated tokens and/or to activate tokens. Printing of tokens separately from activating the postage indicia as postage indicia may be particularly useful in scenarios where envelope manufacturers or other stock manufacturers include tokens for postage indicia on various forms of envelopes and/or other stationary items at the time of manufacture.

Communication system 120 comprises a communication network, represented by base station 121, and a plurality of mobile communication handsets, a representative one of which is mobile communication handset 124. In accordance with an embodiment of the present invention, communication system 120 may provide a wireless communication network, such as may comprise a cellular telephone network (e.g., a Global System for Mobile Communications (GSM) network, an International Mobile Telecommunications-2000 (IMT-2000 or 3G) network, a long term evolution (LTE) network, a 4G network, etc.), a wireless broadband data network (e.g., a wireless LAN network, a WiFi network, a WiMAX network, a general packet radio service (GPRS) network, etc.), and/or the like providing communication to/from user equipment including mobile communication handsets. It should be appreciated that, although communication system 120 has been described above with reference to wireless communication networks, embodiments of communication system 120 may comprise wired networks, such as the Internet, an intranet, an extranet, a LAN, a MAN, a WAN, the PSTN, a cable transmission system, and/or the like.

Mobile communication handset 124 preferably comprises a processor-based system, such as computers having a CPU, memory, and appropriate I/O devices and interfaces, operable under control of instruction sets defining operation as described herein. For example, communication system 120 may comprise a smart phone (e.g., an IPHONE available from Apple Computer Corp., an ANDROID based phone available from various manufacturers, a BLACKBERRY available from Research In Motion, etc.), a network enabled personal digital assistant (e.g., an IPAQ available from Hewlett Packard Corp., an IPAD available from Apple Computer Corp., etc.), and/or the like. Mobile communication handset 124 of embodiments may operate under control of an instruction set (e.g., a smart phone application adapted for use in providing postage indicia) to provide operation as described herein. Additionally or alternatively, resources of mobile communication handset 124 not specifically adapted for providing postage indicia may be used. For example, embodiments may utilize a network browser application, a text messaging (e.g., SMS) application, an email client application, etc. in providing postage indicia herein.

In addition to or in the alternative to the foregoing, mobile communication handsets of embodiments may utilize various applications to facilitate providing postage indicia. For example, an application adapted to decode one or more symbols (e.g., barcode, characters, etc.) appearing in an image to derive appropriate data from image data may be utilized according to embodiments of the invention.

Communication system 120 preferably provides communication of token identification information, mail piece information, mail stock information, and/or account information to activation system 110 for activation of tokens for providing postage indicia according to the concepts of the present invention. Accordingly, the illustrated embodiments of mobile communication handset 124 includes imaging apparatus 123 (e.g., digital camera circuitry) for imaging unactivated tokens, mail pieces, and/or mail stock identification information, as will be discussed in further detail below. Of course, other forms of input of information regarding the forgoing information may be utilized according to embodiments of the invention, such as a keyboard of a user terminal. For example, a keyboard of a user terminal may be utilized to input account information, such as where the mobile communication handset information is not used to identify an appropriate account.

A scale (not shown) may additionally or alternatively be provided for input of mail piece weight, such as for use in rating postage in order to determine an appropriate or desired amount of postage value for activated postage indicia. In one embodiment, a scale may be provided as a sleeve which slides over and closely fits the form of mobile communication handset 124 and having a load sensor disposed therein. The circuitry of such a sleeve may couple to mobile communication handset 124 via a data interface thereof to provide operation wherein mobile communication handset 124 is placed upon a hard surface and a mail piece placed on mobile communication handset 124 for a determination of the weight of the mail piece. Alternatively, a scale module, such as in the form of a dongle, may be coupled to a data interface of mobile communication handset 124 for use in determining the weight of mail pieces. Such a dongle may provide a configuration wherein the dongle, or portion thereof, is rested upon a hard surface and the mail piece placed thereon to determine the weight. Alternatively, such a dongle may provide a configuration wherein the mail piece is suspended from the dongle (e.g., by a hook or a clip) while the dongle, or portion thereof, is itself suspended to determine the weight of the mail piece.

It should be appreciated that rather than being a separate device coupled to the mobile communication handset, circuitry operable to function as a mail piece scale may be integrated into a mobile communication handset. For example, a load sensor may be integrated into a back surface of a mobile communication handset whereby, in use, the mobile communication handset may be placed upon a hard surface and the mail piece placed upon the mobile communication handset in order for the load sensor to measure the weight of the mail piece.

Although embodiments of the invention may utilize a scale, as discussed above, it should be appreciated that the use of such a scale is not a limitation of embodiments herein. For example, embodiments may provide postage in amounts selected by a user (e.g., similar to how a user currently estimates the number of stamps needed for a mail piece without the use of a scale), in flat rate amounts (e.g., using a flat rate program as currently offered by the USPS as their PRIORITY MAIL FLAT RATE shipping program), etc. Additionally or alternatively, embodiments of the invention may operate to determine appropriate postage amounts using means other than a scale, such as using the postage by context techniques shown and described in U.S. Pat. No. 5,983,209, the disclosure of which is incorporated herein by reference. Logic of the mobile communication handset and/or activation system may operate to analyze one or more image of the mail piece (e.g., images of the mail piece contents) to determine appropriate postage amounts using the foregoing postage by context techniques. For example, a number of pages, and perhaps the size of the pages, may be determined from one or more images taken of the mail piece, whereby this information is used in determining or estimating an appropriate amount of postage.

Although shown as integrated components in the embodiment illustrated in FIGS. 1A and 1B, it should be appreciated that mobile communication handset 124 and imaging apparatus 123 may comprise different configurations than that shown. For example, imaging apparatus 123 may be provided as a module coupled to mobile communication handset 124 via a data interface thereof.

Information for use in providing postage indicia, such as token information, mail piece information, user identification information, account information, etc., is preferably provided by mobile communication handset 124 to activation system 110 for activation of tokens and providing postage indicia. Accordingly, a communication interface of mobile communication handset 124 (e.g., a radio transceiver) may be utilized to communicate with activation system 110 via base station 121 and network 101. It should be appreciated that, although embodiments are described herein with reference to the use of wireless links with respect to mobile communication handsets, embodiments of the invention may utilize wired connections (e.g., an Ethernet link, a universal serial bus (USB) link, a fiber optic link, etc.) with respect to mobile communication handsets.

Validation system 130 preferably comprises a processor-based system, such as a computer having a CPU, memory (shown as including database 132), and appropriate input/output (I/O) devices and interfaces, operable under control of an instruction set defining operation as described herein. For example, validation system 130 may comprise server platform 131 having a processor from the CORE family of processors available from Intel Corporation, Santa Clara, Calif. Validation system 130 of the illustrated embodiments provides scanning and validation of activated tokens borne on or otherwise provided by mail pieces as described below. Accordingly, validation system 130 of the illustrated embodiments includes database 132 for storage of validation information (e.g., token identification and status) and mail piece scanner 133 for scanning and processing mail pieces.

It should be appreciated that configurations of validation system 130 other than that illustrated may be utilized according to embodiments of the invention. For example, mail piece scanner 133 may be coupled to activation system 110, such as through network 101, for performing validation as described herein without server platform 131, if desired.

Validation system 130 may be utilized according to a number of techniques for processing tokens of embodiments of the invention. For example, an open loop technique may be implemented with respect to tokens herein whereby the tokens are scanned by validation system 130 and the mail piece allowed to continue in the mail stream. The token may subsequently be analyzed, such as by validation system 130 and/or activation system 110, to determine if appropriate postage value is associated therewith. If a no postage value, or if a deficient postage value, is associated with the token an appropriate account may be debited accordingly. Additionally or alternatively, a closed loop technique may be implemented with respect to tokens herein whereby the tokens are scanned by validation system 130 and the mail piece not allowed to continue in the mail stream until the token is analyzed. For example, the token may be analyzed, such as by validation system 130 and/or activation system 110, to determine if appropriate postage value is associated therewith. If appropriate postage value is associated with the token the mail piece may be allowed to continue in the mail stream. However, if a no postage value, or if a deficient postage value, is associated with the token the mail piece may be prevented from continuing in the mail stream (e.g., returned to the sender) or the appropriate account may be debited before allowing the mail piece to continue in the mail stream.

Use of a validation system, such as validation system 130, is optional according to embodiments of the invention. However, to provide increased confidence as to the validity of postage indicia, and other information based indicia, embodiments of the invention implement a validation system. In order to reduce the volume of processing associated with such a validation system, embodiments of the invention may operate to validate a random or statistical sampling of indicia, rather than each indicia introduced into the mail stream.

Figure 2:
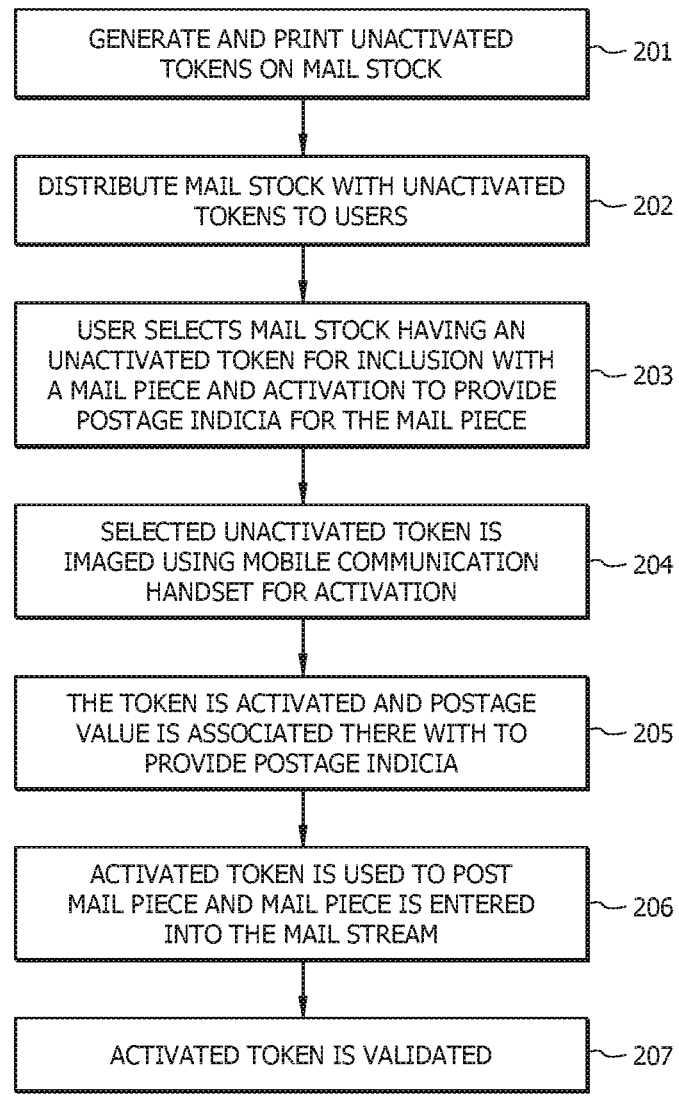
FIG. 2 shows a flow diagram of operation to provide activation of postage indicia according to an embodiment of the present invention.

Operation of embodiments of systems 100 illustrated in FIGS. 1A and 1B to provide postage indicia using mobile communication handsets according to the concepts herein is represented in the flow diagram of FIG. 2. According to the illustrated embodiment, a manufacturer (e.g., a postage service provider such as Stamps.com, Inc.) generates unactivated tokens that may be used in providing postage indicia at block 201. The tokens are printed on mail stock for later activation for providing valid postage indicia. For example, activation system 110 generates a plurality of tokens and controls printer 113 to print tokens 142 upon various mail stock, such as envelopes (e.g., envelope 144), labels (e.g., postage stock 141), sheets of paper, letterhead stock, large envelope (flat) stock, etc. Each such token is preferably unique or substantially unique so as to facilitate accurate validation, accounting, and/or auditing with respect to the activation and use thereof.

Machine readable embodiments of tokens 142 may comprise a bar code such as a PDF417 two dimensional barcode, a data matrix two dimensional barcode, a code 128 one dimensional barcode, a POSTNET (bar and half bar encoding) one dimensional barcode, an intelligent mail (IM) barcode (height-modulated barcode), and/or the like. Additional or alternative forms of machine readable symbology which may utilized according to embodiments of the invention include universal product code (UPC), code 93, dotcode, magnetic ink character recognition (MICR), etc. Tokens may additionally or alternatively be provided in other forms, such as human readable characters (e.g., letters, numerals, and/or symbols), graphic images, and/or the like. Machine readable embodiments of tokens 142 are provided in a form consistent with the information based indicia (IBI) acceptable to postal authorities, such as the United States Postal Service. Tokens 142 need not include all the information of a full MI, such as where tokens 142 comprise a "light" IBI implementation.

A robust barcode such as the aforementioned PDF417 and data matrix barcodes are preferred according to embodiments of the invention in order to encode a relatively large amount of information therein, to provide data redundancy for error correction, to provide data security, etc. A one dimensional barcode such as the aforementioned POSTNET, IM, and code 128 barcodes are preferred according to some embodiments of the invention in order to provide encoded data in a form which is readily scanned using relatively inexpensive and/or which is widely available. Of course, multiple machine readable portions may be included as part of a machine readable token, such as to include a robust two dimensional barcode and a widely readable one dimensional barcode, to accommodate a large variety of use scenarios if desired.

As previously discussed, tokens 142 preferably include a code or other identifying information useful in uniquely identifying the tokens. For example, codes included in the tokens may include serial or sequence numbers, identification information, digital signatures, cryptographic keys, and/or the like useful in uniquely identifying the tokens and/or the postage indicia created therewith. Activation system 110 preferably records such identification information in database 112, such as part of the data of unactivated tokens database 114, for use in activating tokens and/or verifying that postage value is associated therewith.

According to embodiments of the invention information, such as the activation status of tokens, is stored in database 112, such as part of the data of unactivated tokens database 114. For example, when tokens 142 are generated, activation system 110 may store a unique code identifying each generated token in database 112 along with a status identifier indicating the tokens are "unactivated". As discussed below, the status identifier may be updated upon activation of the tokens when postage indicia has been purchased and activated to indicate the indicia are "activated". Such status identifiers may be useful with respect to validation of the indicia, as discussed further below. Additional or alternative information which may be stored in association with tokens may include identification of an entity or account for which the tokens were generated (e.g., a business requesting the tokens for their inventory or their use in mailing mail pieces), an entity generating the tokens (e.g., a service provider generating the tokens), identification of a system used to generate the tokens, cryptographic keys used for encrypting/decrypting information in the tokens, digital signatures used to authenticate the tokens, information regarding geographic areas mail items bearing indicia using the tokens may be introduced into a mail processing stream and/or geographic areas mail bearing indicia using the tokens may be delivered to, particular services and/or levels of service indicia bearing the indicia may be used for, and/or the like. Such additional information may be used in an audit trail with respect to any particular token or indicium created in association therewith, used to detect fraud or abuse of tokens and indicia created in association therewith, used for accounting purposes, used to restrict or manage the use of tokens or indicia created in association therewith, etc.

Tokens of embodiments of the invention may be printed alone or in combination with various images, information, characters, symbols, ornamental images, and/or marks (collectively referred to as marks). For example, tokens may be printed alone, with one or more marks used to facilitate processing of indicia (e.g., a facing identification mark (FIM)), with human readable information, with one or more indicator marks, and/or the like. Such marks may be used in preparing mail items, processing mail items, for aesthetic or other purposes, etc.

At block 202 of the embodiment illustrated in FIG. 2, mail stock (e.g., envelopes 144 of FIG. 1A and/or postage stock 141 of FIG. 1B) having tokens 142 thereon is provided to users (e.g., users requesting such mail stock and which have a postage value account with a service provider associated with activation system 110) for use in activating postage indicia and providing postage indicia using mobile communication handsets. For example, postage stock 141 and or package 145 may be provided to a user for later use with respect to mail pieces to be mailed by the user. It should be appreciated that the user may thus be enabled to post mail pieces as desired, activating the tokens to provide postage indicia on demand, using a mobile communication handset (e.g., mobile communication handset 124) without risk of theft or loss of postage value associated with the mail stock, without risk of postage rate changes rending the mail stock stale, and/or the like.

A user selects mail stock from their supply for inclusion with a mail piece and activation to provide postage indicia at block 203. For example, the user may wish to post document 126 and thus select an envelope for incarcerating the document and forming a mail piece. To complete the mail piece for posting, the user may select one or more label of postage stock 141 and apply the label(s), bearing a respective unactivated token 142, to the envelope, as shown in FIG. 1B, to create a mail piece having envelope 144 bearing unactivated token 142. Alternatively, the user may select envelope 144 already bearing an unactivated token 142 for carrying document 126, as shown in FIG. 1A, to create a mail piece having envelope 144 bearing unactivated token 142.

It should be appreciated that although the illustrated embodiments show a document and envelope, mail pieces accommodated according to the concepts of the present invention may be in various configurations, such as documents without an envelope or other container, flats, parcels, creates, etc. The mail stock may comprise a particular stock suitable for a particular use, such as a sheet of labels to provide tokens which may be applied to irregular sized/shaped mail items, an envelope or flat to provide a mail item container for use in posting a particular mail item, etc. Additionally or alternatively, the mail stock may comprise unactivated tokens suitable for a particular use, such as unactivated tokens having a desired pre-established postage denomination associated therewith (e.g., $0.41) suitable for a particular mail item, unactivated tokens which are denomination agnostic to facilitate activation of postage indicia having one or more desired postage value(s), etc. The mail stock may further comprise desired ornamental images, such as a national flag to commemorate a national holiday, a religious icon to celebrate a religious holiday, a matrimonial icon to celebrate a wedding or anniversary, etc. Accordingly, a user may select a particular configuration of mail stock appropriate to the characteristics of the mail item being posted.

At block 204, the unactivated token(s) of the selected mail stock is imaged using imaging apparatus 123 of mobile communication handset 124 for activation of the unactivated token(s) to provide postage indicia for the associated mail piece. For example, imaging apparatus 123 may be utilized to obtain an image of the unactivated token 142 of envelope 144. Unactivated token information obtained by mobile communication handset 124 is preferably provided to an external system for activation of the token. Mobile communication handset 124 of embodiments, for example, provides information regarding token 142 imaged by imaging apparatus 123 to activation system 110 (e.g., via base station 121 and network 101) for identification of the appropriate unactivated token (e.g., within unactivated tokens database 114) and activation of that token to provide valid postage indicia.

Various forms of imaging apparatus may be utilized as imaging apparatus 123 of embodiments of the invention. For example, traditional digital camera configurations, such as may comprise charge coupled device (CCD) optical sensors, complementary metal-oxide semiconductor (CMOS) optical sensors, or the like may be used with respect to various token configurations. Additionally or alternatively, scanner technology, such as may comprise barcode scanners (e.g., swept laser scanner, light source and photodiode scan head scanner, etc.), may be utilized in deriving image information regarding an unassigned token.

Resources native to mobile communication handset 124, and which are not specifically adapted for use in obtaining postage, may be utilized in obtaining an image of the token and/or communicating unactivated token information to an external system. For example, a camera application native to mobile communication handset 124 (e.g., provided to facilitate snapshots of persons and places) may be utilized to control imaging apparatus 123 to collect an image of unactivated token on envelope 144. Additionally or alternatively, a SMS texting application or email client application which are not specifically adapted for use in obtaining postage may be utilized to communicate the image obtained and/or information derived there from to an external system such as activation system 110.

Alternatively, resources which are specifically adapted for use in obtaining postage may be provided to mobile communication handset 124 and used in obtaining postage. In operation according to embodiments of the invention, postage indicia acquisition logic (e.g., in the form of a processor executable application) may be provided to mobile communication handset 124 which automates token activation operation. For example, a user may launch a postage indicia acquisition application on mobile communication handset 124 and be guided through acquiring an image of unactivated token 142 (e.g., the application interfacing with imaging apparatus 123 to obtain the image) and communication of information regarding token 142 to the appropriate external system (e.g., interfacing with a radio transceiver of mobile communication handset 124).

Embodiments of the invention may operate to provide an image of the unactivated token to the above mentioned external system. For example, an image of unactivated token 142 acquired by imaging apparatus 123 may be provided by mobile communication handset 124 to activation system 110 for activation of the token to provide valid postage indicia. The image may be altered or modified (e.g., manually by a user, automatically by a postage indicia acquisition application, etc.) to facilitate optimized operation of systems 100, to reduce communication bandwidth utilized, etc. For example, the image may be cropped to include substantially only an image of unactivated token 142, may be manipulated to provide improved image contrast, may be time/date stamped, and/or the like.

Additionally or alternatively, embodiments of the invention may operate to provide information derived from an image of the unactivated token to the above mentioned external system. For example, logic of mobile communication handset 124 may analyze an acquired image to identify a token present therein and decode information from the token (e.g., where token 142 comprises a barcode, the logic may comprise barcode scanning logic operable to decode the barcode to derive the information therein). This information derived from the image may be provided to the external system to facilitate optimized operation of systems 100, to reduce communication bandwidth utilized etc. Such information may, for example, comprise substantially unique token identification information.

Information in addition to the unactivated token information, such as a desired amount of postage, mail piece information (e.g., weight, class, handling, etc.), postage account information, mobile communication handset identification information (e.g., electronic serial number, subscriber identification module (SIM) information, telephone number, media access control (MAC) address, etc.), user identification information, etc.), address information (e.g., origination address, destination address), and/or the like, may be provided for use in providing postage indicia according to embodiments of the invention. Some or all of this additional information may be provided to activation system 110, mobile communication handset 124, and/or validation system 130. The user may, for example, select an amount of postage for the desired postage indicia, a class of mail, an account for payment of postage services and/or postage value, etc. In some embodiments the aforementioned postage acquisition application may query the user as to some or all of the foregoing information for communication to an external system accompanying the information regarding the token. Additionally or alternatively, various apparatus may be utilized to obtain such additional information. For example, a scale (not shown), such as may be in the form of a scale dongle, sleeve, etc. connectable to a data interface of mobile communication handset 124, may be used to obtain a weight of the mail piece associated with the unactivated token for determining an amount of postage for the desired postage. Rating information (e.g., of a postage acquisition application operable upon mobile communication handset 124, of an application operable upon activation system 110, etc.) may be used to determine an appropriate postage value.

It should be appreciated that the foregoing information may be provided directly or indirectly. For example, a user may input a number, and perhaps a size, stock weight, etc., of the mail item contents for calculation of mail item weight, and correspondingly the postage amount, by logic of the mobile communication handset and/or activation system. Additionally or alternatively, information from which a mail item weight is determined or estimated may be provided in the form of one or more images of the mail item contents (e.g., photos of the pages comprising the mail item, photos of an object to be posted, etc.) may be obtained by the mobile communication handset for use in determining mail item weight. This information may be analyzed, such as by logic of the mobile communication handset and/or activation system, for determining mail item weight, and correspondingly the postage amount. For example, a number of pages, and perhaps the page sizes, stock weight, etc. (e.g., as may be determined by reference to other items in the image, such as an item placed in the image for reference, from information provided by the user, etc.), may be used to estimate the total weight of the mail item.

The unactivated token(s) of the acquired image is activated to provide valid postage indicia at block 205 of the illustrated embodiment. In providing activation of the token, activation system 110 preferably operates to change the status of one or more particular tokens 142 identified by the unactivated token information provided by mobile communication handset 124 from "unactivated" to "activated." For example, activation system 110 may locate the substantially unique code or other information provided in the unactivated token information communicated by mobile communication handset 124 in database 112 and change status information of tokens associated therewith. It should be appreciated that logic of activation system 110 may analyze an image provided by mobile communication handset 124 to identify a token present therein and decode information from the token (e.g., where token 142 comprises a barcode, the logic may comprise barcode scanning logic operable to decode the barcode to derive the information therein).

Irrespective of whether a token is identified directly from the unactivated token information or derived from the unactivated token information, activation system 110 of embodiments may operate to indicate an activated state of the identified token by providing an activated state status indicator stored in association with the unique code of the token. For example, embodiments may operate to change a status indicator stored in association with the unique code, by moving the unique code from an "unactivated" portion of the database to an "activated" portion of the database, and/or the like. Accordingly, activation of a token may comprise moving data associated with that particular token from unactivated tokens database 114 to activated tokens database 115 and/or to database 132 of validation system 130. Such a change in status according to embodiments of the invention results in the corresponding tokens becoming indicative of valid postage indicia.

Activation system 110 may communicate the fact that the token has been activated and/or other information, such as a value of the activated token, to mobile communication handset 124 and/or validation system 130 for use thereby. For example, activation system 110 may provide a SMS message or other message to mobile communication handset 124 for confirming to the user that the token has been activated as a valid postage indicium. It should be appreciated that the use of a confirmation message sent to the mobile communication handset may not be utilized according to embodiments of the invention. For example, activation system 110 may transmit a confirmation email to a user's email account which is independent of the mobile communication handset. Similarly, activation system 110 may transmit a confirmation facsimile and/or aural message to a telephone number of the user's choice (e.g., associated with an office or hotel room presently occupied by the user). The activation system may provide no direct confirmation of activation of the token, according to embodiments of the invention. In such embodiments, a user and/or logic of the mobile communication handset may, for example, determine that the token has been activated as a valid postage indicium by reference to a debit in an appropriate amount, at a relevant time, etc. to a user's account, by reference to audit trail information, and/or the like.

Processing of token information in addition to or in the alternative to changing a token state from "unactivated" to "activated" may be desired. For example, embodiments of activation system 110 preferably provide processing to facilitate accounting for postage indicia. Embodiments of the invention may utilize information provided with the aforementioned unactivated token information, such as mail piece weight, postal class, origination location information, destination information, and/or special handling instructions, in order to determine a postal rate, to provide statistical reporting, etc. Activation system 110 may operate to debit an account (or otherwise account for postage value) for the appropriate postal value, such as using the aforementioned determined rate or the desired postage amount transmitted with the unactivated token information. For example, user account information, user identification, mobile communication handset identification information, account identification information, etc. provided with the unactivated token information may be utilized to determine an appropriate account from which to debit funds sufficient to provide remuneration for the posting of the mail piece.

An account from which funds for postage indicia activation are debited may be a postage account (e.g., an Internet postage meter account as provided by Stamps.com Inc.) associated with the user or other entity, with the token, with the mail piece, etc. Additionally or alternatively, an account from which funds for postage indicia activation are debited may not be a postage account, such as a communication services account, credit/debit card account, bank account, prepaid account, etc. associated with the user or other entity. In operation according to embodiments of the invention, a prepaid electronic commerce account (whether a prepaid postage account, a general purpose electronic commerce account, or otherwise) is stored by or in association with the mobile communication handset which is debited in association with activation of the token as a postage indicium. In accordance with one embodiment of the invention, the mobile communication handset may store one or more prepaid electronic commerce token specifically adapted for use in payment for activation of postage indicia according to the concepts herein. Other embodiments of the invention operate to increment a communication services account (e.g., a cellular telephone account) associated with the mobile communication handset in association with activation of the token as a postage indicium.

From the foregoing it can be appreciated that accounting for postage value payment may be made through incrementing an ascending register and decrementing a descending register, as is typical of a postage meter operation, or through a payment transaction more traditionally used outside of postage metering applications (e.g., without the use of secure ascending and descending registers). For example, prepaid accounts, postpaid accounts, electronic funds transfer, electronic commerce, and/or the like may be used according to embodiments of the invention. In operation according to embodiments of the invention, activation system 130 implements a "zero balance" or accumulated postage type postage meter configuration facilitating postpaid postage activation. Details with respect to accumulated type postage meter configurations as may be adapted for use according to embodiments of the invention are shown and described in the above referenced patent application entitled "Postage Metering with Accumulated Postage."

Accounting for postage value payment may be performed at or near the time of activation of the token or at another time, according to embodiments of the invention. For example, embodiments of the invention may operate to account for postage value payment upon actual use of the postage indicia. Validation system 130, for example, may operate to perform postage value payment accounting, such as described above, upon detection of a postage indicia herein otherwise not having the postage value thereof accounted for.

Although embodiments have been described above with respect to mobile communication unit 120, activation system 110, and/or validation system 130 performing operation to debit an appropriate account for postage value associated with postage indicia activated herein, it should be appreciated that such account debts may be performed by systems other than those identified above. For example, any of mobile communication unit 120, activation system 110, and/or validation system 130 may track or record information regarding amounts of postage value associated with postage indicia activation and provide this information (e.g., on a postage indicia activation transaction by transaction basis, in batch, periodically, etc.) to one or more external systems (e.g., a payment processing center, such as a credit card payment center, an electronic commerce payment center, etc.) for debiting appropriate accounts for postage value.

It should be appreciated that embodiments of the invention may collect value or fees in addition to a postage amount. For example, embodiments of the invention may implement one or more of the foregoing funding techniques to collect a surcharge for the service of postage indicia activation as described herein.

Processing in addition to changing a token state provided according to embodiments of the invention may comprise generation of information and/or making information available for use in validation of postage indicia. For example, activation system 110 may provide access to, or information from, database 112 to validation system 130 for use in validating postage indicia which have been introduced into the mail processing stream. The foregoing information may, according to embodiments, include information in addition to information identifying activated tokens. Information, such as may include user identification, account information, etc., may be provided to validation system 130 for use in fraud detection, providing an audit trail, etc. IBI type indicia or the information thereof (e.g., comprising user account information, meter identification information, cryptographic digital signature information, postage value information, delivery destination information, and/or the like) may be desired by a delivery service provider for use with respect to security, accounting, validation, tracking, fraud detection, etc. Such postage indicia information may be collected and/or generated by activation system 110 and provided to, or otherwise made available to, validation system 130 for use in validation according to embodiments of the invention.

From the foregoing, embodiments of activation system 110 operate to provide additional processing to generate postage indicia information in coordination with changing the status of an unactivated token to an activated token. Additional details with respect to the generation of postage indicia information are provided in the above referenced patent applications entitled "Computer-Based Value-Bearing Item Customization Security" and "Systems and Methods for Facilitating Replacement of Computer-Based Value-Bearing Items." It should be appreciated that in such embodiments, an activated token herein may essentially become an "IBI light" indicium having full IBI information associated therewith in the generated postage indicia information. Such generated postage indicia information may be stored in correspondence to the particular activated token, such as in activated tokens database 115 and/or database 132.

Additional functions may be performed by or in response to activation system 110 activating tokens according to embodiments of the invention. For example, activation system 110 may operate to dispatch a courier to retrieve mail pieces, scheduling postal processing resources, providing reports, etc. in coordination with activating one or more tokens herein.

At block 206 the activated token(s) is utilized to post mail pieces. For example, the mail piece may be introduced into the mail stream (represented by infrastructure 150 of FIGS. 1A and 1B) for handling by a delivery service provider (e.g., the USPS).

Activated tokens associated with mail pieces introduced into the mail stream, or a statistical sampling thereof, are preferably validated (e.g., before mail processing, during mail processing, and/or after mail processing) at block 207. For example, mail piece scanner 133 of validation system 130 may obtain information from one or more tokens present on a mail piece for use with information stored in database 112 and/or 132 (e.g., comparison of the scanned information to the stored information) in order to validate the token as an activated token having postage value associated therewith. Mail piece scanner 133 may thus comprise traditional optical scanner configurations, such as flat bed scanners, sheet fed scanners, handheld scanners, camera based scanners, or the like when indicia which is visible in natural light are used.

Where special inks are used, mail piece scanner 133 may be adapted to work with the characteristics of the special ink (e.g., illuminate fluorescent inks with the appropriate wavelength of light in order to cause the inks to fluoresce, illuminate phosphorescent inks with an appropriate light source to cause the inks to phosphoresce, shift the light source or optical receiver position to observe color shifts in color shifting inks, generate a magnetic field to detect the presence of magnet inks, etc.). Such operation of mail piece scanner 133 may be to facilitate scanning of the token and/or other printed items. Additionally or alternatively, such operation of mail piece scanner 133 may be to observe a resulting phenomena, such as for fraud or counterfeit detection.

It should be appreciated that mail piece scanners used in validating activated tokens may scan more than a token present on a mail piece. For example, additional information useful in validating the token, in creating an audit trail (e.g., destination address information, return address information, user/account identification information, etc.), in determining an account for payment for an under valued postage indicia (e.g., insufficient postage), unactivated token (e.g., introduced into the mail stream without having been activated), or postpaid activated token (e.g., activated without debiting an account for the postage value), etc. may be obtained from mail items by operation of a mail piece scanner.

According to embodiments of the invention, as a mail item is processed (e.g., at a mail service provider's mail processing station) after the mail item has been introduced into the mail stream, the mail piece is passed through mail piece scanner 133 for scanning tokens 142 to obtain information such as the aforementioned unique code. Validation system 130 may compare this information to information in database 132 and/or database 112 to determine if the token has been properly activated. Validation processing provided by validation system 130 may comprise analyzing information, such as postage indicia information, stored in association with an activated token record.

Tokens utilized according to embodiments of the invention for providing postage indicia may be validated using a number of validation techniques. For example, an open loop validation technique may be implemented with respect to certain tokens whereby tokens are scanned by validation system 130 for subsequent validation processing and the mail pieces allowed to continue in the mail stream. Validation system 130 and/or activation system 110 may thereafter provide processing to determine if the token has been properly activated, if appropriate postage value (e.g., as indicated by an associated postage indicium or postage indicium information) is associated therewith, etc. If a no postage value is associated with the token (e.g., the token is an unactivated token) or if a deficient postage value is associated with the token (e.g., the token is activated but an amount of postage value which is improper for the associated mail piece has been provided) an appropriate account may be debited (e.g., by operation of validation system 130 and/or activation system 110). For example, information regarding the user (e.g., user identification information), the mobile communication handset (e.g., mobile communication handset identification information) used with respect to the token, etc. may be utilized to identify an appropriate account from which to obtain funds for proper activation of the token.

It should be appreciated that even where the token is unactivated (as opposed to activated with an improper postage amount) embodiments of an open loop validation technique may operate to identify an appropriate account for obtaining funds. For example, code 143 as may be applied to postage stock 141 (FIG. 1A) and/or package 145 (FIG. 1B) may identify a range of unactivated tokens provided to a particular user. Thus, the substantially unique code of an unactivated token may be determined to correspond to a particular code 143 having been provided to a particular user. Similarly, each unassigned token provided to a user may be stored for use in making such determinations.

A closed loop validation technique may be implemented with respect to certain tokens whereby the tokens are scanned by a validation system and the mail piece not allowed to continue in the mail stream until the token is analyzed. For example, the token may be analyzed, such as by validation system 130 and/or activation system 110, to determine if appropriate postage value (e.g., as indicated by an associated postage indicium or postage indicium information) is associated therewith. If the token is determined to be valid (e.g., activated and having an appropriate postage value associated therewith), validation system 130 may allow the mail item to pass for further processing (e.g., processing for delivery to an appropriate destination address). However, if the postage indicium is not valid (e.g., the token is unactivated or does not have an appropriate postage value associated therewith), validation system 130 may prevent further processing (e.g., direct the mail item to a "return to sender" bin). If desired, such a closed loop system may operate to activate a token determined to be unactivated, as discussed above, and thus allow the mail item to continue in the mail stream after such activation has been performed.

Validation system 130 and/or activation system 110 may provide processing in addition to or in the alternative to validation processing after a mail piece has been introduced into the mail stream. For example, various audit processing may also be performed by activation sever system 110 and/or validation system 130, such as to detect fraud or abuse of indicia, used for accounting purposes, etc., using the aforementioned token information and/or indicia information during processing of mail items or thereafter. Such additional processing may additionally or alternatively include providing a user with tracking information regarding a mail piece, notifying a user of the detected misuse of indicia, statistical analysis of indicia usage (e.g., to detect fraud or attempted fraud), etc. It should be appreciated that information regarding a mobile communication device utilized in activating a token may be collected by systems 100 for use in providing tracking information, reporting information, etc. to a user regarding a mail piece associated with a particular token.

From the above it can be seen that operation according to the embodiment of FIG. 2 provides postage indicia for mailing documents using a mobile communication handset. A user utilizing the embodiments as described with reference to FIG. 2 is enabled to introduce mail pieces into a mail delivery stream which are accepted as having activated, value comprising postage indicia associated therewith without the use of traditional metering systems, processor-based postage generation and printing systems, or even printers. Because a mobile communication handset is utilized in activating tokens according to embodiments, the user is enabled to obtain postage for mail pieces at any time and in any place. Moreover, because the unactivated tokens of the postage stock of embodiments are only activated at or near a time of mail piece creation, the risk of loss, theft, or misuse is minimized.

The tokens used according to embodiments may be provided in forms other than preprinted embodiments. For example, tokens utilized according to embodiments of the invention may provide tokens comprising substantially unique information derived from the mail pieces themselves. System 300 of FIG. 3 illustrates such an embodiment which may be implemented using a process flow substantially as illustrated in FIG. 2 except that postage stock having preprinted tokens thereon is foregone in favor of the use of substantially unique information derived from the mail piece.

Figure 3:
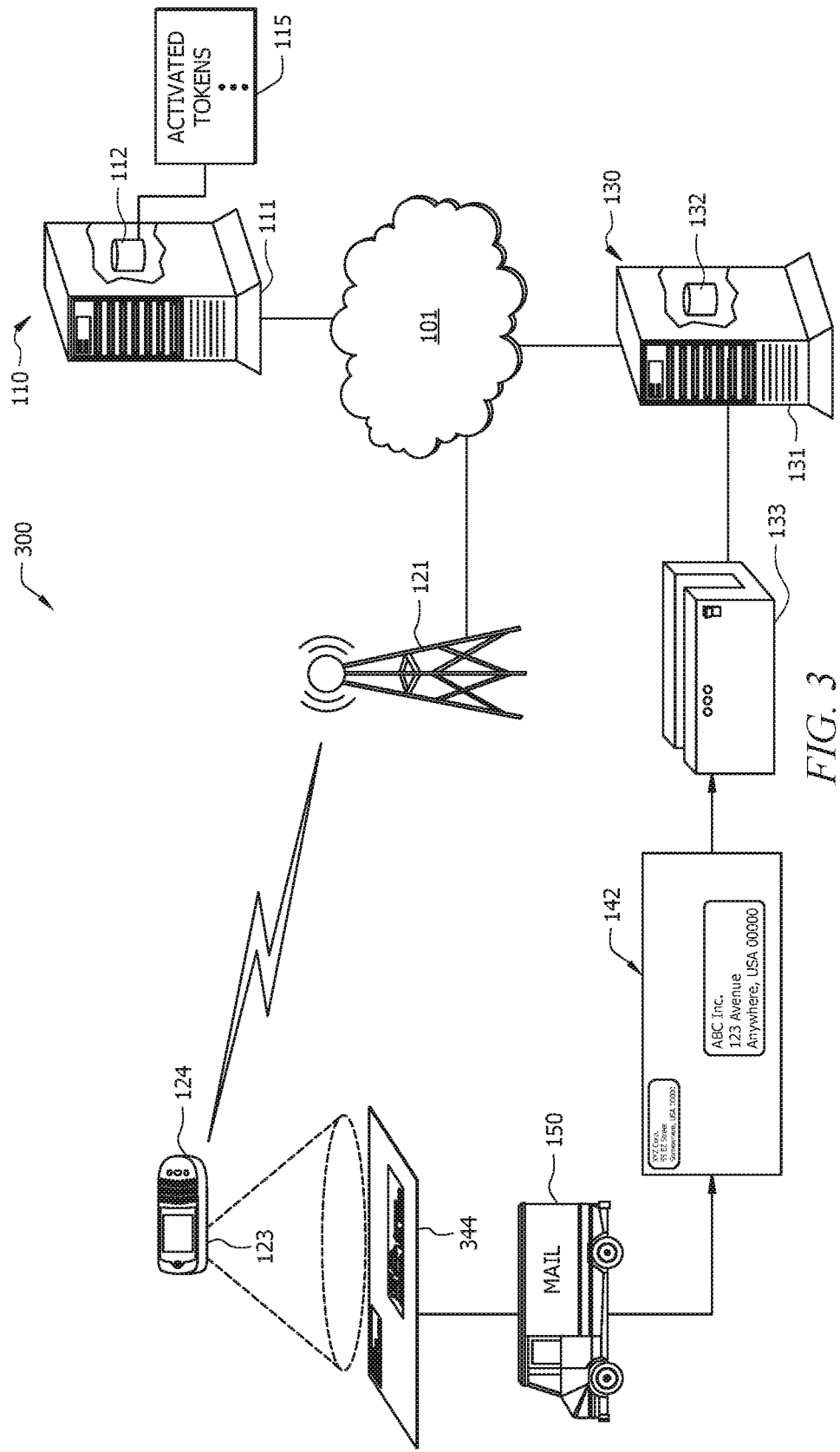
FIGS. 3 and 4 show systems adapted to provide activation of postage using a mobile communication handset according to alternative embodiments of the present invention.

As shown in FIG. 3 imaging apparatus 123 of mobile communication handset 124 may be operated to photograph a portion of the mail piece (e.g., front face of mail piece 344 having address information imprinted thereon), communicate information regarding the mail piece (e.g., the image, data derived from the image, etc.) to activation system 110, and cause the portion of the mail piece to be activated as a token having postage value associated therewith. Accordingly, rather than altering a state of a preprinted token from "unactivated" to "activated," as discussed above, operation of system 300 may utilize the information regarding the portion of the mail piece to generate an activated token associated with mail piece 344 which is substantially unique. Thereafter, the mail piece may be introduced into the mail stream (represented by infrastructure 150 of FIG. 3). Mail piece scanner 133 of validation system 130 may obtain an image of the same portion of the mail piece for use with information stored in database 112 and/or 132 (e.g., comparison of the scanned information to the stored information) in order to validate this token as an activated token having postage value associated therewith. Mail piece scanner 133 may comprise traditional optical scanner configurations, such as flat bed scanners, sheet fed scanners, handheld scanners, camera based scanners, or the like.

It should be appreciated that a token generated from an image of a portion of a mail piece, as used in embodiments such as shown in FIG. 3, may comprise the actual image and/or information derived there from. For example, a hash algorithm or other algorithm operable to provide a reduced dataset which uniquely maps to the portion of the mail piece imaged may be utilized in providing tokens according to embodiments. Although such reduced datasets may be advantageous with respect to the use of bandwidth in transmission of token information and with respect to memory used in processing and/or storing token information, the use of more full image information may be preferable according to some embodiments. For example, an image of a portion of the mail piece may be useful not only in providing tokens herein but also in providing information regarding a mail piece that was posted (e.g., as proof of posting of a particular item).

In providing the foregoing operation in which substantially unique information derived from the mail pieces themselves is used rather than a preprinted token, information may be provided upon the mail piece in order to facilitate activation of the postage. For example, a user may hand write user or account identification information (e.g., a phone number associated with a postage account, a phone number of a communication service account to which postage is to be charged, a postage account number, a postage meter number having an account to which postage is to be charged, an address of the user, etc.) upon the mail piece for use in identifying an account to which the postage value is to be debited. It should be appreciated that the foregoing information may be clear text (e.g., such as in the case of a phone number) such that anyone viewing the mail piece may obtain the information or may be coded (e.g., such as in the case of an account number) such that someone viewing the mail piece without knowledge of the code is not able to obtain the underlying information. For example, database 112 may store a look up table associating pseudo random code numbers with user account numbers for use according to embodiments of the invention. The foregoing information, or a portion thereof, (e.g., such as in the case of an address of the user) may be obtained from information (e.g., return address information) otherwise present some mail pieces according to embodiments of the invention.

Tokens used according to embodiments provided in forms other than preprinted embodiments may comprise substantially unique information which is applied upon a mail piece by a user. For example, tokens utilized according to embodiments of the invention comprise substantially unique information obtained from an activation system which is thereafter applied to a mail piece by hand. System 400 of FIG. 4 illustrates such an embodiment which may be implemented using a process flow substantially as illustrated in FIG. 2 except that postage stock having preprinted tokens thereon is foregone in favor of the use of substantially unique information provided by an activation system which is applied to the mail piece by hand.

Figure 4:
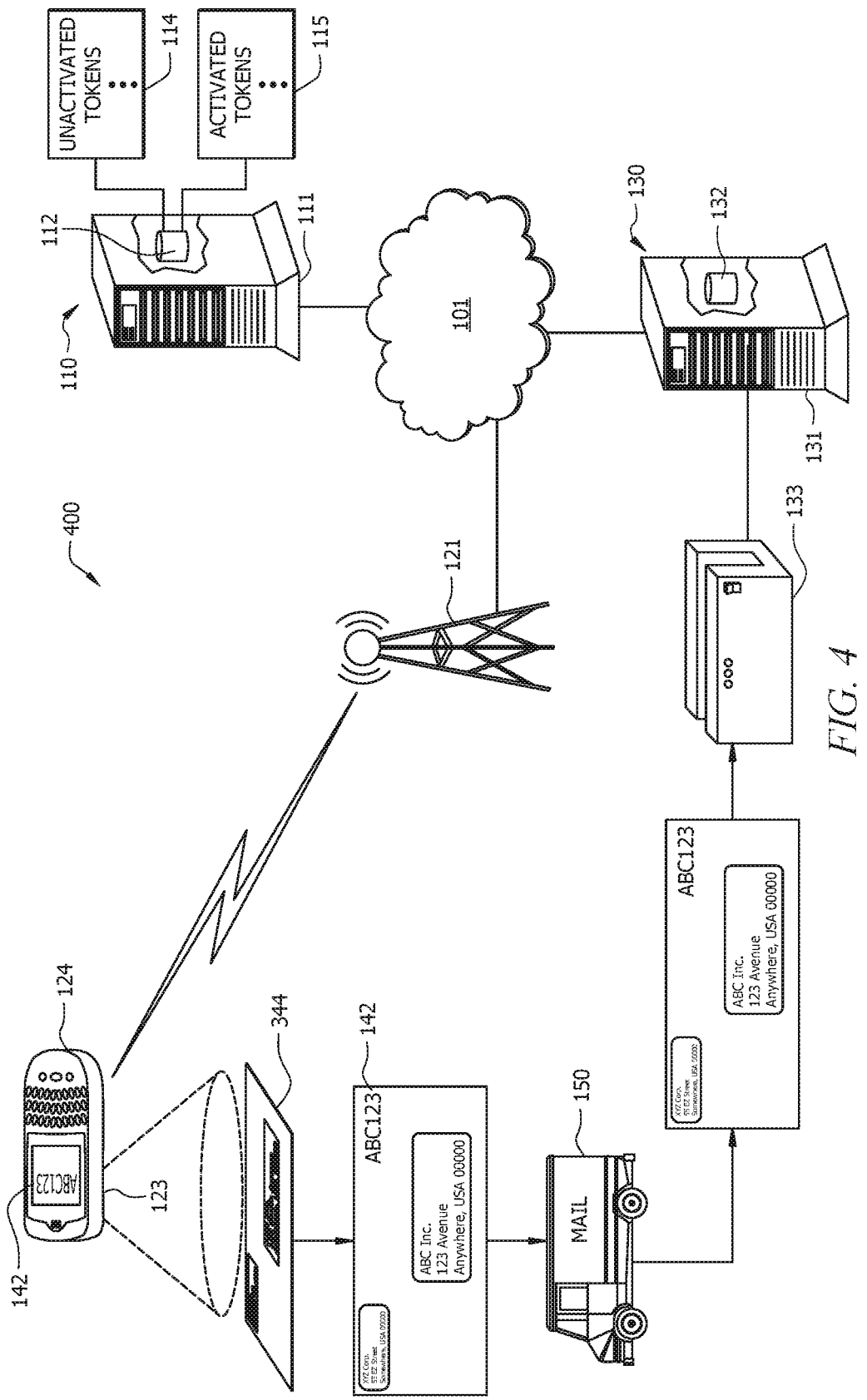

As shown in FIG. 4, a user may utilize mobile communication handset 124 to request postage for a mail piece. For example, the user may use a SMS application, an electronic mail application, a postage indicia acquisition application, or other resource of mobile communication handset 124 to communicate a request for postage to activation system 110. The postage request may comprise a desired amount of postage, mail piece information (e.g., weight, class, handling, etc.), postage account information, mobile communication handset identification information (e.g., electronic serial number, subscriber identification module (SIM) information, telephone number, media access control (MAC) address, etc.), user identification information, etc.), address information (e.g., origination address, destination address), and/or the like, for use in providing postage indicia according to embodiments of the invention.

According to embodiments, imaging apparatus 123 of mobile communication handset 124 is operated to photograph a portion of the mail piece (e.g., front face of the mail piece) for communication of information regarding the mail piece (e.g., the image, data derived from the image, etc.) to activation system 110 as or with a request for postage. Such mail piece information may be utilized in deriving a token for application on the mail piece (e.g., somewhat as in the embodiment of FIG. 3, although the generated token in this embodiment is applied to the mail piece), in providing information regarding a mail piece that was posted (e.g., as proof of posting of a particular item), etc.

In operation according to embodiments, activation system 110 generates or otherwise associates a token comprising substantially unique information for use with the mail piece and provides this token to the user, such as through mobile communication handset 124, transmission of an email to a user's email account, transmission of a facsimile and/or aural message to a telephone number of the user's choice (e.g., associated with an office or hotel room presently occupied by the user), etc. For example, activation system 110 may generate a substantially unique token using some portion of information provided to activation system 110 by mobile communication handset 124 in the request for postage. Alternatively, activation system 110 may select a previously generated token (e.g., from unassigned tokens database 112) for use with the particular mail piece. Irrespective of how it is generated, information regarding the activated token may be stored by activation system 110 (e.g., in activated tokens database 115) and/or validation system 130 (e.g., in database 132) for validation in association with the mail piece being processed in the mail stream.

Activated token 142 provided by activation system 110 may be communicated to mobile communication handset 124 for display to a user, such as upon a screen thereof. Additionally or alternatively, token 142 may be transmitted to a user by various means separate from mobile communication handset 124 (e.g., an email to a user's email account, a facsimile and/or aural message to a telephone number of the user's choice, etc.). Token 142 of such an embodiment may comprise a string of characters (e.g., alphanumeric text, graphic symbols, icons, etc.) which may be applied upon the mail piece (e.g., handwritten upon the mail piece) as an activated token having postage value associated therewith. Accordingly, a user may transcribe activated token 142 upon the mail piece to provide postage acceptable to a delivery service provider. Thereafter, the mail piece may be introduced into the mail stream (represented by infrastructure 150 of FIG. 4). Mail piece scanner 133 of validation system 130 may obtain information from one or more tokens present on a mail piece for use with information stored in database 112 and/or 132 (e.g., comparison of the scanned information to the stored information) in order to validate the token as an activated token having postage value associated therewith.

Although various embodiments have been described above as providing activation of tokens in response to a request for postage, it should be appreciated that not all such requests may result in activation of a token. For example, where a user account associated with the request has insufficient funds to provide remuneration for the requested postage, and possibly a charge for this service, a request may be denied and no token activated (or token activation delayed) until the funding issue is resolved. Security and other features restricting the activation of tokens may similarly result in failure to activate a token in response to a request for postage. For example, a user may request that activation system 110 be configured to provide postage associated with the user's account only in response to requests originating from one or more particular mobile communication handset (e.g., using electronic serial number, subscriber identification module (SIM) information, telephone number, media access control (MAC) address, etc.), to reduce the risk of fraudulent postage requests.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for transforming a mail piece into a postage indicium, the method comprising:
receiving, by one or more processors of an activation system, information associated with an image of a mail piece from a user device, wherein the image includes address information associated with the mail piece;
generating, by the one or more processors, a token based on a hash function and the image information;
storing, by the one or more processors, the token at a database;
transmitting, by the one or more processors, information to the user device to indicate that the token has been activated, wherein activation of the token indicates that the token is a valid postage indicium;
charging, by the one or more processors, a postage account of a user corresponding to the user device based on a value associated with the valid postage indicium;
receiving, by the one or more processors, second image information associated with a second image of the mail piece, wherein the second image of the mail piece is captured by an imaging device operating within a mail stream into which the mail piece has been placed;
validating, by the one or more processors, the mail piece is associated with an activated token based on the second image information and the token stored at the database.

2. The method of claim 1, further comprising performing mail processing operations with respect to one or more mail items within the mail stream are associated with deficient postage value.

3. The method of claim 2, wherein the mail processing operations comprise charging one or more postage accounts an amount corresponding to a difference between the deficient postage value and a correct postage value.

4. The method of claim 2, wherein the mail processing operations comprise returning the one or more mail items to one or more senders corresponding to the one or more mail items.

5. The method of claim 1, wherein the token is generated by executing the hash function against the image information.

6. The method of claim 1, wherein the token is generated by executing the hash function against information derived from the image information.

7. The method of claim 1, wherein the postage account of the user is determined based on information derived from the image information.

8. A method for transforming a mail piece into a postage indicium, the method comprising:
 capturing, by one or more processors of a user device, an image of a mail piece from a user device, wherein the image includes address information associated with the mail piece;
 transmitting, by the one or more processors, image information associated with the image of the mail piece to an activation server; and
 receiving, by the one or more processors, information that indicates a token has been generated for the mail piece based on a hash function and the image information, wherein the information further indicates the token has been activated as a valid postage indicium, and wherein the token is validated as the valid postage indicium based on execution of the hash function against a second image information associated with a second image of the mail piece captured by an imaging device operating within a mail stream into which the mail piece has been placed.

9. The method of claim 8, wherein a postage account associated with a user of the user device is charged an amount associated with a value of the valid postage indicium.

10. The method of claim 8, wherein mail processing operations are performed with respect to one or more mail items placed in the mail stream.

11. The method of claim 10, wherein the mail processing operations comprise:
 detecting one or more mail items associated with a deficient postage value; and
 charging one or more postage accounts an amount corresponding to a deficiency for each of the one or more mail items.

12. The method of claim 10, wherein the mail processing operations comprise:
 detecting one or more mail items associated with a deficient postage value; and
 returning the one or more mail items to one or more senders corresponding to the one or more mail items.

13. The method of claim 8, further comprising estimating a value of the valid postage indicium based on the image of the mail piece.

14. The method of claim 8, wherein the image information comprises information derived from a portion of the image of the mail piece that includes information identifying a sender of the mail piece.

15. A system for transforming a mail piece into a postage indicium, the system comprising:
 an imaging device configured to capture an image of a mail piece;
 a memory; and
 one or more processors communicatively coupled to the imaging device and the memory, the one or more processors configured to:
  transmit image information associated with the image of the mail piece to an activation server; and
  receive information that indicates a token has been generated for the mail piece based on a hash function and the image information, wherein the information further indicates the token has been activated as a valid postage indicium, and wherein the token is validated as the valid postage indicium based on execution of the hash function against a second image information associated with a second image of the mail piece captured by an imaging device operating within a mail stream into which the mail piece has been placed.

16. The system of claim 15, wherein a postage account associated with a shipper of the mail piece is charged an amount associated with a value of the valid postage indicium.

17. The system of claim 16, wherein mail processing operations are performed with respect to one or more mail items placed in the mail stream.

18. The system of claim 17, wherein the mail processing operations comprise:
 detecting one or more mail items associated with a deficient postage value; and
 charging one or more postage accounts an amount corresponding to a deficiency for each of the one or more mail items.

19. The system of claim 17, wherein the mail processing operations comprise:
 detecting one or more mail items associated with a deficient postage value; and
 returning the one or more mail items to one or more senders corresponding to the one or more mail items.

20. The system of claim 15, wherein the image information comprises information derived from a portion of the image of the mail piece that includes information identifying a sender of the mail piece.

* * * * *